(12) United States Patent
Ascani et al.

(10) Patent No.: US 10,913,467 B2
(45) Date of Patent: Feb. 9, 2021

(54) WIRELESS CONTROLLED RAILCAR CARGO LOADING SYSTEM

(71) Applicant: Rollerbed Systems, LLC, Dallas, PA (US)

(72) Inventors: Rich Ascani, Dallas, PA (US); Jim Youse, Birdsboro, PA (US)

(73) Assignee: Rollerbed Systems, LLC, Dallas, PA (US)

( * ) Notice: Subject to any disclaimer, the term of this patent is extended or adjusted under 35 U.S.C. 154(b) by 69 days.

(21) Appl. No.: 16/393,692

(22) Filed: Apr. 24, 2019

(65) Prior Publication Data

US 2019/0329798 A1 Oct. 31, 2019

Related U.S. Application Data

(60) Provisional application No. 62/662,298, filed on Apr. 25, 2018.

(51) Int. Cl.

| *B61D 47/00* | (2006.01) |
|---|---|
| *B65G 13/02* | (2006.01) |
| *B65G 13/12* | (2006.01) |
| *B65G 43/00* | (2006.01) |
| *B66F 3/35* | (2006.01) |

(Continued)

(52) U.S. Cl.
CPC ............. *B61D 47/005* (2013.01); *B61D 3/04* (2013.01); *B65G 13/02* (2013.01); *B65G 13/12* (2013.01); *B65G 39/025* (2013.01); *B65G 43/00* (2013.01); *B66F 3/35* (2013.01); *B65G 67/20* (2013.01); *B65G 2203/0233* (2013.01)

(58) Field of Classification Search
CPC ...... B65G 13/02; B65G 13/12; B65G 39/025; B65G 43/00; B65G 67/20; B65G 2203/0233; B65G 2207/34; B61D 3/02; B61D 3/04; B61D 17/10; B61D 47/00; B61D 47/005; B64D 2009/006; B66F 3/35; B60P 1/52
USPC ........................................ 193/35 MD, 35 SS
See application file for complete search history.

(56) References Cited

U.S. PATENT DOCUMENTS

| 293,285 A | * | 2/1884 | Stiles | ....................... B61D 3/04 |
|---|---|---|---|---|
| | | | | 105/372 |
| 2,802,583 A | * | 8/1957 | Dansereau | ............. B61D 47/00 |
| | | | | 414/534 |

(Continued)

*Primary Examiner* — Gene O Crawford
*Assistant Examiner* — Keith R Campbell
(74) *Attorney, Agent, or Firm* — Douglas J. Ryder; Ryder, Mazzeo & Konieczny LLC

(57) ABSTRACT

A railcar loading system utilizing roller ball track assemblies, or the like, in the center to enable cargo to be moved thereover in any direction (moving cargo in/out and within the railcar). Powered movement devices (e.g., rollers, conveyors) are utilized in the center to assist in movement of cargo in/out or within the railcar. Roller track assemblies, or the like, are utilized on sides of railcar to move cargo to/from the sides. Airbags may be utilized in track assemblies and powered movement devices to raise devices up when activated. Railcar may include an air connector on each side to provide air to solenoid valve that routes air to appropriate airbags. Cargo table is used to move cargo from cargo bay to railcar. Wireless controller may be used to control railcar and table including what tracks are raised and direction cargo is to be moved (what powered movements devices are operational).

20 Claims, 26 Drawing Sheets

(51) Int. Cl.
*B65G 39/02* (2006.01)
*B61D 3/04* (2006.01)
B65G 67/20 (2006.01)

(56) References Cited

U.S. PATENT DOCUMENTS

| | | | | |
|---|---|---|---|---|
| 3,130,829 | A | * | 4/1964 | Long .................. B65G 13/12 193/35 SS |
| 3,282,456 | A | * | 11/1966 | Hawes ................ B61D 47/00 414/502 |
| 3,504,636 | A | * | 4/1970 | Alder .................. B61D 3/04 410/67 |
| 3,885,506 | A | * | 5/1975 | Mundinger ........... B61D 17/10 410/139 |
| 4,780,043 | A | * | 10/1988 | Fenner ................ B64C 1/20 198/316.1 |
| 8,702,366 | B2 | | 4/2014 | Campbell et al. |
| 10,221,022 | B2 | | 3/2019 | Campbell et al. |
| 2003/0198544 | A1 | | 10/2003 | Campbell et al. |
| 2004/0213652 | A1 | | 10/2004 | Campbell et al. |
| 2005/0158158 | A1 | * | 7/2005 | Porta .................. B65G 63/025 414/392 |
| 2009/0297304 | A1 | | 12/2009 | Campbell et al. |

* cited by examiner

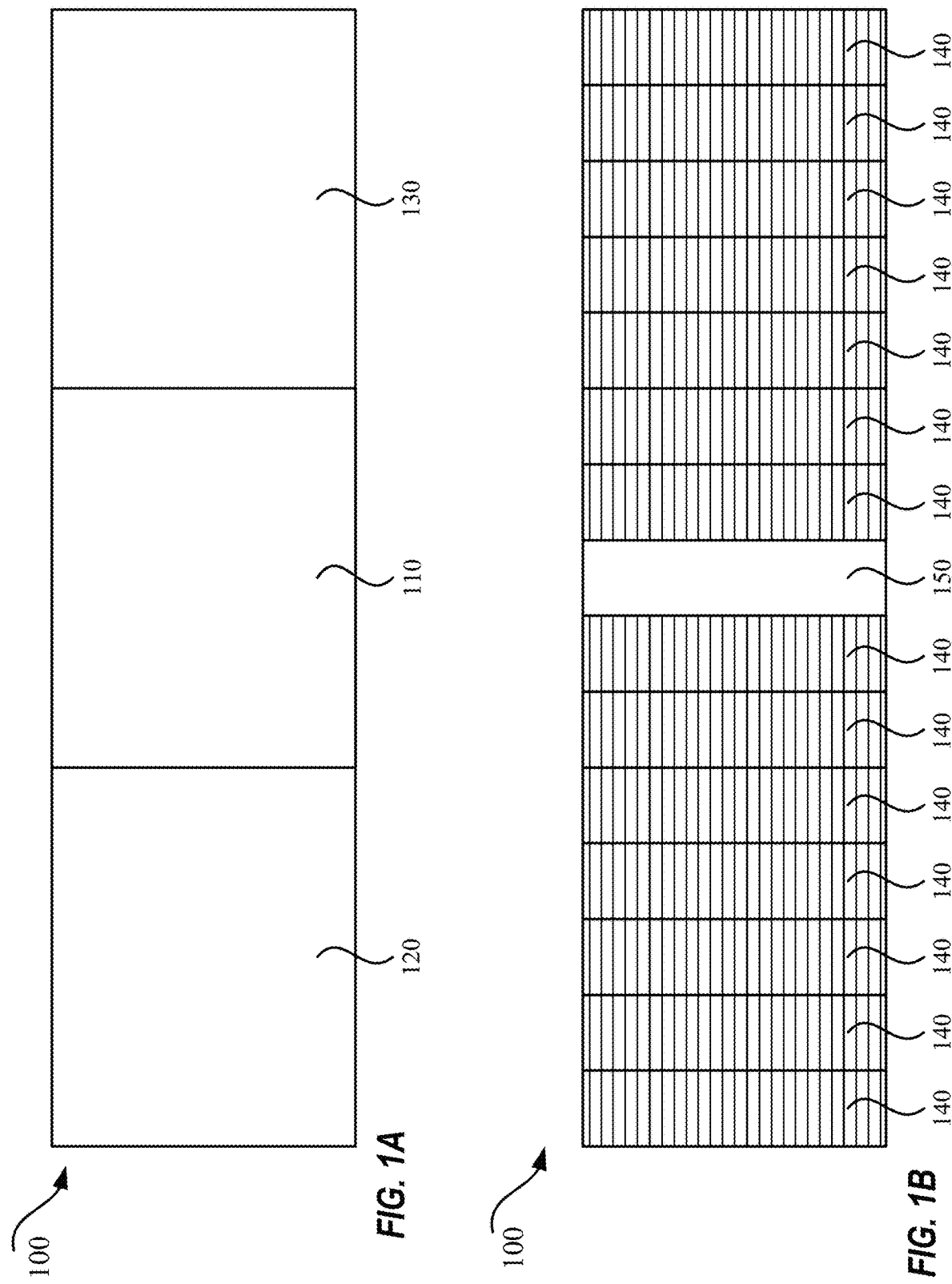

WIRELESS CONTROLLED RAILCAR CARGO LOADING SYSTEM

BACKGROUND

The use of trains to transport cargo has long been known. The trains can transport large amounts of cargo on fixed pathways (tracks) between locations. As the railcars have doors substantially centered on the sides thereof, the cargo enters the appropriate side of the railcar and is then moved within the railcar. Depending on the orientation of the train with respect to the platform at the station (cargo bay), the cargo needs to be moved either to the left or the right to get to the front or back of the railcar.

FIG. 1A illustrates a simplified side view of an example railcar 100. The railcar 100 includes a sliding door 110 centrally located on each side of the railcar 100 (only one door visible in the side view) and separating the railcar 100 into a first section (e.g., front, back) 120 and a second section (e.g., back, front) 130.

FIG. 1B illustrates a simplified side view of the example railcar 100 having racks 140 of cargo loaded therein. As illustrated, the cargo racks 140 are loaded to the left and right of the door 110 (front and back of the railcar 100) and there is a gap 150 where no racks are located so as to enable the racks 140 to be loaded and unloaded from the railcar 100 onto a loading dock. The number and size of the cargo racks 140 is in no way intended to be limited to the illustrative example.

FIG. 1C illustrates a simplified top view of a railcar 100 on railroad tracks 160 at a cargo bay 170. As illustrated, the cargo bay 170 is on the right side of the railcar 100 but is in no way limited thereto. Furthermore, the railcar 100 is not limited in the direction in which it will be traveling. When the railcar 100 is stopped at the cargo bay 170 there will be a gap 180 therebetween. Furthermore, the floor of the railcar 100 and the cargo bay 170 may not align (one may be higher than other). Accordingly, a cargo table (e.g., ramp) 190 may utilized to provide a bridge therebetween that is used to move cargo between the railcar 100 and the cargo bay 170 via the door 110. The table 190 may be aligned with the gap 150 to facilitate loading and unloading of the railcar 100. As illustrated, a left edge of the table 190 is aligned with a left edge of the gap 150 (but is not limited to the illustrated embodiment). Once the cargo is within the railcar 100, the cargo can be moved within the railcar 100. The railcar 100 and the table 190 may include some type of roller/tracking system (not illustrated) for moving the cargo in and out of the railcar 100 and within the railcar 100.

FIG. 2 illustrates a simplified view of a tracking system on a cargo table 190.

The table 190 may include a plurality of rollers 200 that roll in a first (e.g., into railcar) or a second direction (e.g., out of railcar) along a plane based on the manner in which the cargo is being advanced. It should be noted that only a few of the rollers 200 are labeled for ease of illustration. The direction the rollers 200 may move when cargo is being moved thereover is indicated with a dashed line. The rollers 200 may be housed within track assemblies 210, 220 that align the rollers 200. The track assemblies 210, 220 make up rows of rollers 200. The number of rows of rollers 200 is not limited to the number illustrated or any number. As illustrated, the assemblies 210 are much smaller than the assemblies 220 but is not limited thereby. Rather, the different identification of assemblies 210, 220 is simply to indicate that some rollers 200 may be continuously placed along the table 190 while others may have gaps therebetween. The number of rollers 200 housed within the assemblies 210, 220 is not limited to the number illustrated or any specific number. The table 190 may further include a powered roller 230 to assist in the loading or unloading of cargo into or out of the railcar. The powered roller 230 may be located within a housing 240 and be capable of being operated in either a first (e.g., into railcar) or a second direction (e.g., out of railcar). The direction the powered roller 230 may be operated in is indicated with a solid line. The number and location of the powered roller 230 is not limited to what is illustrated.

In order to ensure that the cargo doesn't inadvertently roll, the powered roller 230 and the rollers 200 may be located below the surface of the table 190 (and thus not be capable of moving the cargo) when not in use. When the cargo is to be moved, the powered roller 230 and the rollers 200 may be raised up so as to be above the surface of the table 190 and be capable of moving the cargo. The rollers 200 may be raised up by inflating an airbag (not illustrated) that is located below the rollers 200. The airbag may be located within the assemblies 210, 220. The powered roller 230 may also be raised up by inflating an airbag (not illustrated) located therebelow. The airbag may be located within the housing 240. The table 190 may have connectors (not illustrated) for connecting the airbags to an air source with flow of air to the airbags being controlled by a manual valve. The airbags for the rollers 200 may all be connected to one another and thus all operated together and the airbag for the powered roller 230 may be separately operated.

FIG. 3 illustrates a simplified view of a tracking system within a cargo railcar 100. The center of the railcar 100 (aligned with the doors 110) includes items for moving cargo in and out of the railcar 100 as well as items for moving the cargo around within the railcar 100. The items for moving cargo into and out of the railcar 100 include a plurality of first retractable rollers 300 and a first retractable powered roller 320. The items for moving cargo within the railcar 100 include a plurality of second retractable rollers 340 and second retractable powered rollers 360, 370. The plane in which the plurality of first retractable rollers 300 and the first retractable powered roller 320 operate is same as the rollers 200 and powered roller 230, and is perpendicular to the plane that the plurality of second retractable rollers 340 and the second retractable powered rollers 360, 370 operate.

The plurality of first retractable rollers 300 are capable of moving in a first or second direction (indicated with a dashed line) as the cargo is being moved thereover (into or out of the railcar from either side). The rollers 300 may be housed within track assemblies 310 that align the rollers 300. The track assemblies 310 make up rows of the rollers 300, where the track assemblies 310 are installed perpendicular to the doors 110 (traverse from a door to a mid-point of the center of the railcar 100). It should be noted that only a few of the rollers 300 and a few of the assemblies 310 are labeled for ease of illustration. The number of rollers 300 in an assembly 310 and the number of assemblies 310 is not limited to the number illustrated or any number. Furthermore, the location, configuration and orientation is not limited to the illustrated embodiment. The first powered roller 320 is to assist with moving cargo into or out of either side of the railcar 100. The powered roller 320 may be located within a housing 330 and be capable of being operated in either a first or a second direction that is indicated with a solid line. The location of the powered roller 320 is not limited to what is illustrated and more than one powered roller 320 could be utilized.

The plurality of second retractable rollers 340 are capable of moving in a first or second direction (indicated with a dashed line) as the cargo is being moved thereover (to the front or back of the railcar 100). It should be noted that the rollers 300, 340 may be the same type of rollers with the different designations being to indicate that they rotate along different planes (perpendicular planes). The rollers 340 may be housed within track assemblies 350 that align the rollers 340. The track assemblies 350 make up rows of the rollers 340, where the track assemblies 350 are installed parallel to the doors 110 (traverse from a front to a back of the center of the railcar 100). It should be noted that only a few of the rollers 340 with the assemblies 350 are labeled for ease of illustration. The number of rollers 340 in an assembly 350 and the number of assemblies 350 is not limited to the number illustrated or any number. The second powered rollers 360 are to assist with moving cargo to the front or back of the railcar 100. The powered rollers 360, 370 may be located within housings 365, 375 and be capable of being operated in either a first or a second direction that is indicated with a solid line. The number and location of the powered rollers 360, 370 is not limited to what is illustrated.

The first and second sections 120, 130 of the railcar 100 include a plurality of the second retractable rollers 340. The rollers 340 may be housed within track assemblies 380, 390 that align the rollers 340. It should be noted that only a few of the rollers 340 and a few of the assemblies 380, 390 are labeled for ease of illustration. The track assemblies 380, 390 make up rows of the rollers 340 that are installed parallel to the doors 110 (traversing from center of the railcar 100 to front or back of the railcar 100 respectively). The number of rollers 340 in an assembly 380, 390 and the number of assemblies 380, 390 is not limited to the number illustrated or any number. As illustrated, the assemblies 350 are smaller than the assemblies 380, 390 and the assemblies 380, 390 are the same size, but is not limited thereby. Rather, the different identification of assemblies 350, 380, 390 is simply to indicate location of the rollers 340 within the railcar.

As noted above with respect to the table 190, the retractable rollers 300, 340 and the powered rollers 320, 360, 370 may be located below the floor when not in operation in order to ensure they are not utilized to shift the cargo around when not desired (e.g., when the railcar 100 is in transit). The rollers 300, 340 may be raised up by inflating an airbag (not illustrated) that is located below the rollers 300, 340. The airbag may be located within the assemblies 310, 350, 380, 390. The powered rollers 320, 360, 370 may also be raised up by inflating an airbag (not illustrated) located therebelow. The airbag may be located within the housing 330, 365, 375.

Various airbags within the railcar 100 may be connected together in some fashion to create airbag sections that may be operated together. For example, all the airbag associated with the assemblies 310 may be connected together and/or connected to a single source of air to create an airbag section. Likewise, airbag sections may be created for the airbags associated with the assemblies 350, the airbags associated with the assemblies 380, and the airbags associated with the assemblies 390. The railcar 100 may have one or more connectors (not illustrated) for connecting the airbags (for powered rollers 320, 360, 370) and airbag sections (for assemblies 310, 350, 380, 390) to an air source (not illustrated). The flow of air to the airbags/airbag sections may be controlled by a manual valve (not illustrated) associated with each powered roller and assembly section.

FIGS. 4A-H illustrate the operation of the various components of the railcar 100 when loading cargo into the railcar 100. FIG. 4A illustrates the actions to be taken when cargo is being moved into the railcar 100 from a cargo platform 170 (located on right side of railcar 100). While not illustrated it is understood that to move cargo into the railcar 100 that the table 190 will be operational. Within the railcar 100 the airbag sections associated with the assemblies 310 are inflated so that the rollers 300 extend through the floor and the airbag associated with the housing 330 is inflated so that the powered roller 320 extends through the floor (for ease of illustration the dotted line identifies the components that have been activated). As noted above, to inflate the airbags a connection between the railcar 100 and an air source is required and the appropriate valves need to be turned on to provide the air to the appropriate airbags/airbag sections. The powered roller 320 is operated in a first direction (to the left) as indicated by the solid arrow to assist in moving the cargo entering the right side (open door) of the railcar 100 to the left side (toward closed door) of the railcar 100. The rollers 300 will rotate to the left as indicated by the dashed arrow as the cargo traverses thereover.

FIG. 4B illustrates the actions to be taken once the cargo has been moved into the railcar 100 from the cargo platform 170. The powered roller 320 is turned off and the appropriate valves are turned off so that the airbag section associated with the assemblies 310 is deflated so that the rollers 300 retract into the floor and the airbag associated with the housing 330 is also deflated so that the roller 320 retracts into the floor.

FIG. 4C illustrates the actions to be taken to move the cargo from the center of the railcar to the back of the railcar (to bottom of page as illustrated). The valves associated with the airbag sections for the assemblies 350, 380 and the airbags for the housings 365, 375 are turned on so that the airbags are inflated and the rollers 340 and the powered rollers 360, 370 extend through the floor (for ease of illustration the dotted line identifies the components that have been activated). The powered rollers 360, 370 are operated in a first direction (to the bottom) as indicated by the solid arrow to assist in moving the cargo to the back of the railcar 100. The rollers 340 will rotate downward as indicated by the dashed arrow as the cargo traverses thereover.

FIG. 4D illustrates the actions to be taken once the cargo has been moved to the back of the railcar 100. The powered rollers 360, 370 are turned off and the appropriate valves are turned off so that the airbags sections associated with the assemblies 350, 380 and the airbags associated with the housings 365, 375 are deflated so that the rollers 340 and the powered rollers 360, 370 retract into the floor.

After the cargo has been moved to the back, additional cargo will be loaded into the railcar 100. FIG. 4E illustrates the steps taken to load cargo into the center (same as illustrated in FIG. 4A) and FIG. 4F illustrates the steps taken after the cargo has entered the railcar (same as illustrated in FIG. 4B).

FIG. 4G illustrates the actions to be taken to move the cargo from the center of the railcar to the front of the railcar (to top of page as illustrated). The valves associated with the airbag sections for the assemblies 350, 390 and the airbags associated with the housings 365, 375 are turned on so that the airbags are inflated and the rollers 340 and the powered rollers 360, 370 extend through the floor (for ease of illustration the dotted line identifies the components that have been activated). The powered rollers 360, 370 are operated in a second direction (to the top) as indicated by the solid arrow to assist in moving the cargo to the front of the railcar 100. The rollers 340 will rotate upward as indicated by the dashed arrow as the cargo traverses thereover.

FIG. 4H illustrates the actions to be taken once the cargo has been moved to the front of the railcar 100. The powered rollers 360, 370 are turned off and the appropriate valves are turned off so that the airbags sections associated with the assemblies 350, 390 and airbags associated with the housings 365, 375 are deflated so that the rollers 340 and the powered rollers 360, 370 retract into the floor.

To remove cargo from the railcar 100, the process is basically reversed. The variation being that when the cargo is loaded in the front or back of the railcar that the powered rollers 360, 370 located in the center of the railcar will not aid in bringing the cargo to the center. Accordingly, moving cargo to the center of the railcar may require manually pulling the cargo over the appropriate rollers 340 that have been activated. Once the cargo is in the center section of the car, the powered rollers 360, 370 may be utilized to align the cargo and the powered roller 320 can assist in unloading the cargo from the appropriate side of the railcar.

The need to connect multiple air lines and manually control each of the air lines to operate different airbag sections in order raise and lower different rollers is labor intensive and requires a full time operator at a stationary set of controls which does not always allow an optimum view of the moving cargo. Furthermore, the need to raise the rollers 300 in the center of the railcar to bring cargo into the railcar (or remove cargo from the railcar) and then lower the rollers 300 and raise the rollers 340 in the center of the railcar to move cargo within the railcar is time consuming and makes the operations more complex. What is needed is a method and apparatus for simplifying the process.

BRIEF DESCRIPTION OF THE DRAWINGS

The features and advantages of the various embodiments will become apparent from the following detailed description in which:

FIG. 1A illustrates a simplified side view of an example railcar;

FIG. 1B illustrates a simplified side view of the example railcar having racks of cargo loaded therein;

DETAILED DESCRIPTION

Roller balls can be rotated in any direction. A track assembly that used roller balls in place of rollers would enable the same track assembly to be utilized to move cargo in multiple directions (in/out of car, forward/backward within railcar). Using roller ball track assemblies in the center of a railcar would eliminate the need to raise a first set of assemblies in the center of the railcar in order to move the cargo thereinto, then lower the first set of assemblies and raise a second set of assemblies in order to move the cargo within the railcar. Rather, when using roller ball track assemblies in the center of the railcar would simply require the roller ball track assemblies to be raised when cargo was being moved, whether the movement was into or out of the car, or within the railcar.

Figure 5A:
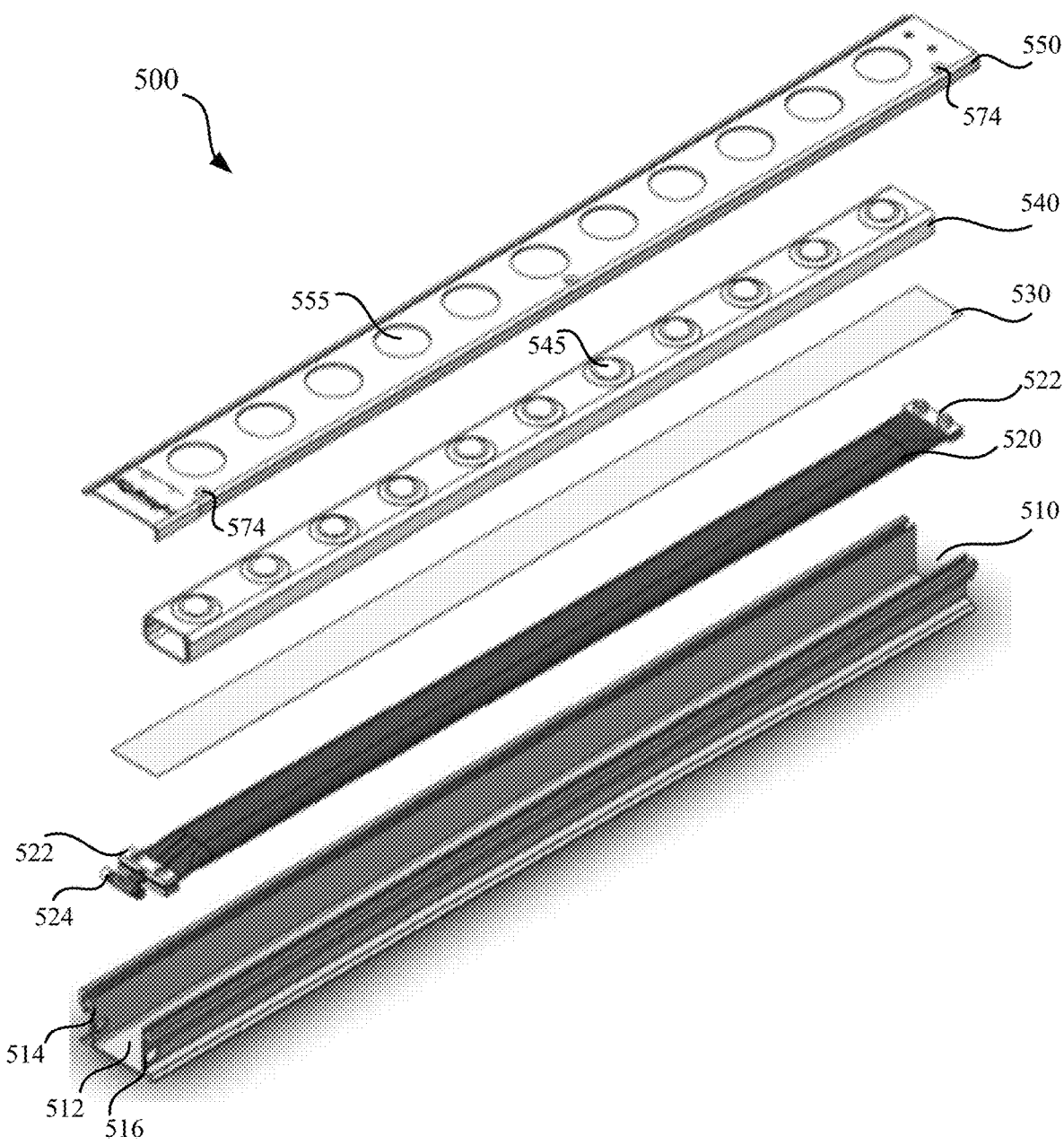
FIGS. 5A-C illustrate several views of an example roller ball track assembly, according to one embodiment.
Figure 5B:
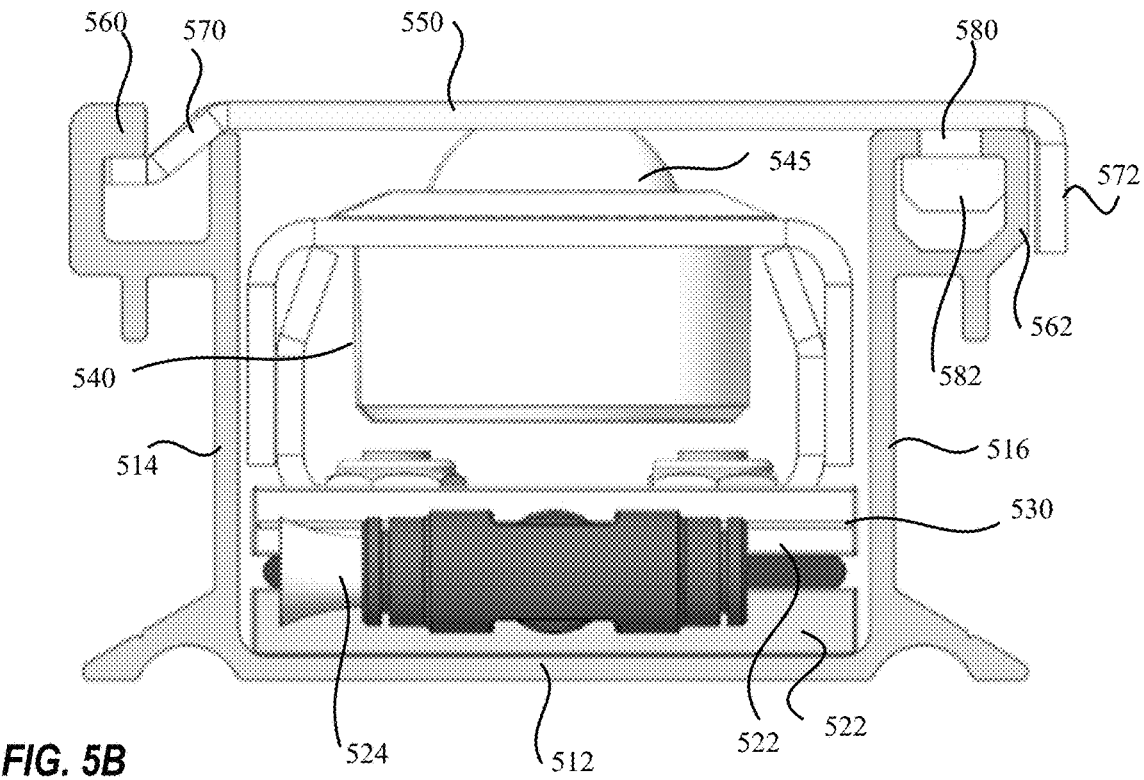
Figure 5C:
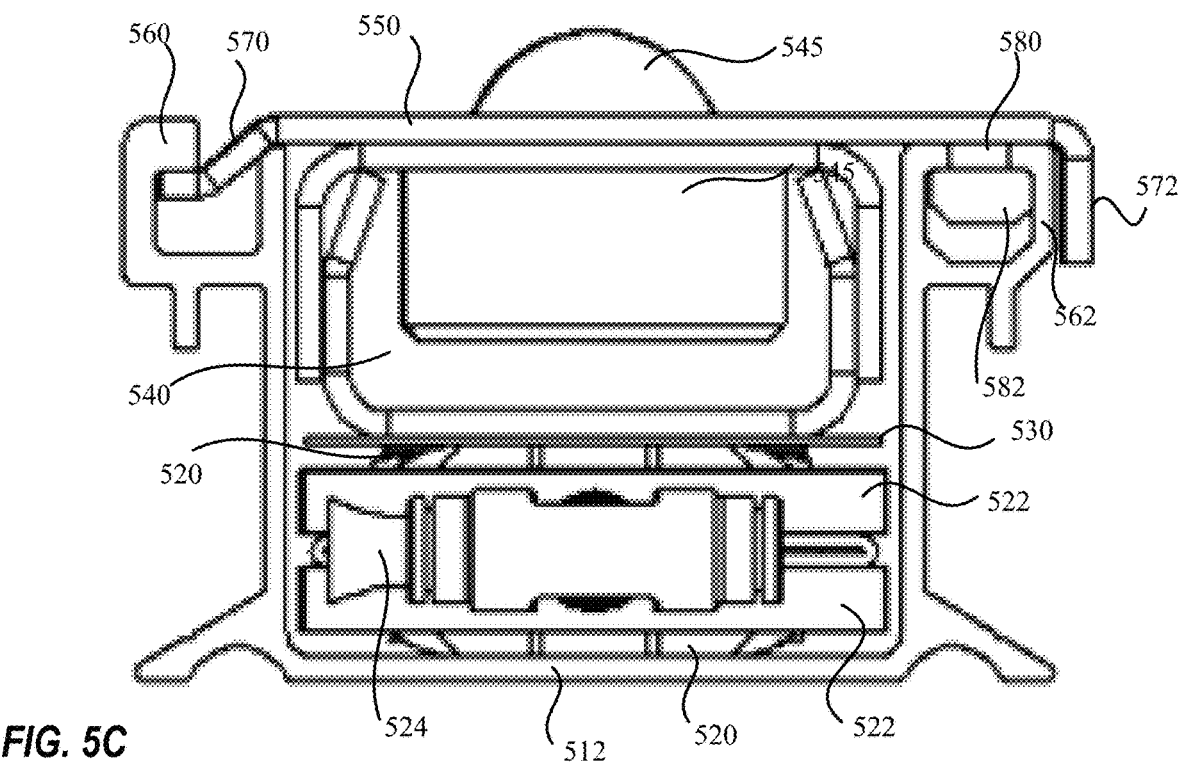

FIGS. 5A-C illustrate several views of an example roller ball track assembly 500. FIG. 5A illustrates an exploded perspective view of the roller ball track assembly 500. The roller ball track assembly includes an external housing 510, an airbag assembly 520, a safety strip 530, a roller ball assembly 540 and a top plate 550. The external housing 510 is formed as a channel with a bottom 512 and a pair of sidewalls 514, 516 that the airbag assembly 520, the safety strip 530 and the roller ball assembly 540 fit within and that the top plate 550 mounts on top of. The airbag assembly 520 is located on the bottom of external housing 510 and includes clamps 522 for securing the airbags 520 on each side thereof and an inlet fitting 524 for receiving tubing that enables the airbag assembly 520 to receive air from an air supply when inflation is activated. The safety strip 530 is located on top of the airbag assembly 520 to ensure that the airbag assembly 520 is not damaged by the roller ball assembly 540. The roller ball assembly 540 includes a housing to support a plurality of roller balls 545. The top plate 550 includes a plurality of holes 555 to enable the trackballs 545 to extend therethrough.

FIG. 5B illustrates a side view of the example roller ball track assembly 500 in a non-activated (non-inflated) state. The external housing 510 includes a first receptacle 560 and a second receptacle 562 on the top of the sidewalls 514, 516 respectively. The top plate 550 includes a flange 570 and a tab 572 at opposite ends thereof. The flange 570 is to be received in the first receptacle 560. The connection between the flange 570 and the first receptacle 560 may act a pivot point for the top plate 550 (enable the top plate 550 to pivot therearound when open). The tab 572 is to extend over a side of the second receptacle 562. The top plate 550 may further includes a plurality of holes 574 formed in close proximity to the tab 572 and in alignment with the second receptacle 562. The holes 574 are to receive screws 580 and the second receptacle 562 is to receive nuts 582. The screws 580 and the nuts 582 are to secure the top plate 550 in place.

The airbag 520 is not inflated so all that is visible are the clamps 522 and the inlet fitting 524. In this configuration, the roller ball assembly 540 is resting on the safety strip 530 which is on the deflated airbag assembly 520 so that roller ball 545 is located within the roller ball track assembly 500 (below the floor in the freight railcar).

FIG. 5C illustrates a side view of the example roller ball track assembly 500 in an activated (inflated) state. The inflated airbag 520 pushes the safety strip 530 and the roller ball assembly 540 upward so that the roller ball 545 protrudes through the opening in the top plate 550 (extends above the floor in the freight railcar).

Figure 6:
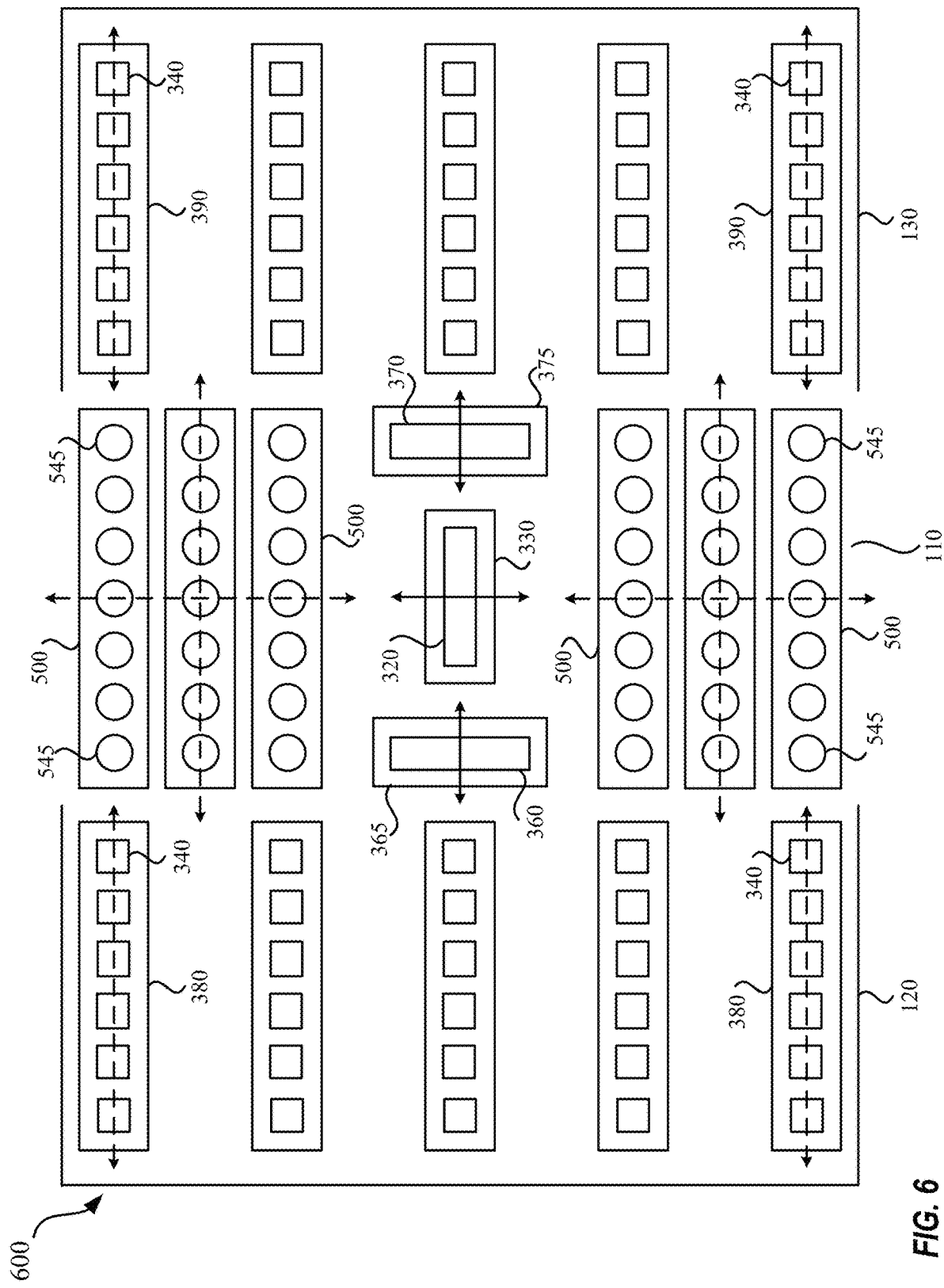
FIG. 6 illustrates a simplified view of an example cargo railcar with a tracking system using roller ball track assemblies, according to one embodiment.

FIG. 6 illustrates a simplified view of a cargo railcar 600 with a tracking system using roller ball track assemblies 500. The center of the railcar 600 (aligned with the doors 110) includes items for moving cargo in and out of the railcar 600 as well as items for moving the cargo around within the railcar 600. The items for moving cargo into and out of the railcar 600 include a plurality of retractable roller balls 545 within a plurality of track assemblies 500 and the first retractable powered roller 320 within the housing 330. The items for moving cargo within the railcar 600 include the roller ball track assemblies 500 and second retractable powered rollers 360, 370 within the housings 365, 375. The roller ball track assemblies 500 may operate in the plane associated with moving cargo in/out of the railcar (same plane as the rollers 200 and powered roller 230 of the table 190 and the powered roller 320) as well as the plane associated with moving cargo within the railcar 600 (same plane as the plurality of second retractable rollers 340 and the powered rollers 360, 370) as indicated by the dashed lines.

The track assemblies 500 make up rows of the roller balls 545. It should be noted that only a few of the roller balls 545 and a few of the assemblies 500 are labeled for ease of illustration. The number of roller balls 545 in an assembly 500 and the number of assemblies 500 is not limited to the number illustrated or any number. As illustrated, the track assemblies 500 are installed parallel to the doors (traversing from front to back of center of the railcar 600). However, the location, configuration and orientation is not limited to the illustrated embodiment. For example, the track assemblies could be mounted perpendicular to the doors 110 in similar fashion to the assemblies 310.

Figure 1C:
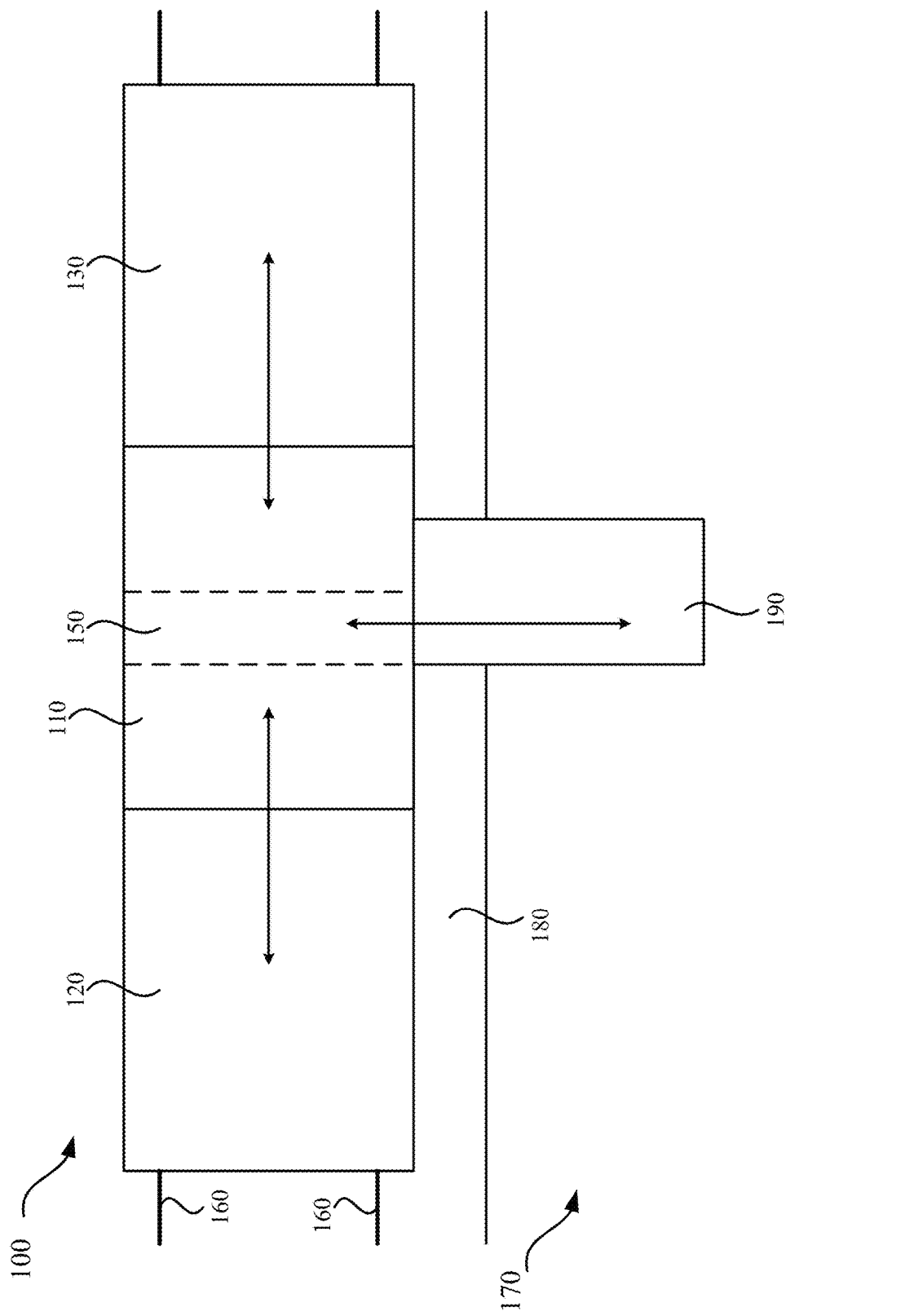
FIG. 1C illustrates a simplified top view of a railcar on railroad tracks at a cargo bay.
Figure 2:
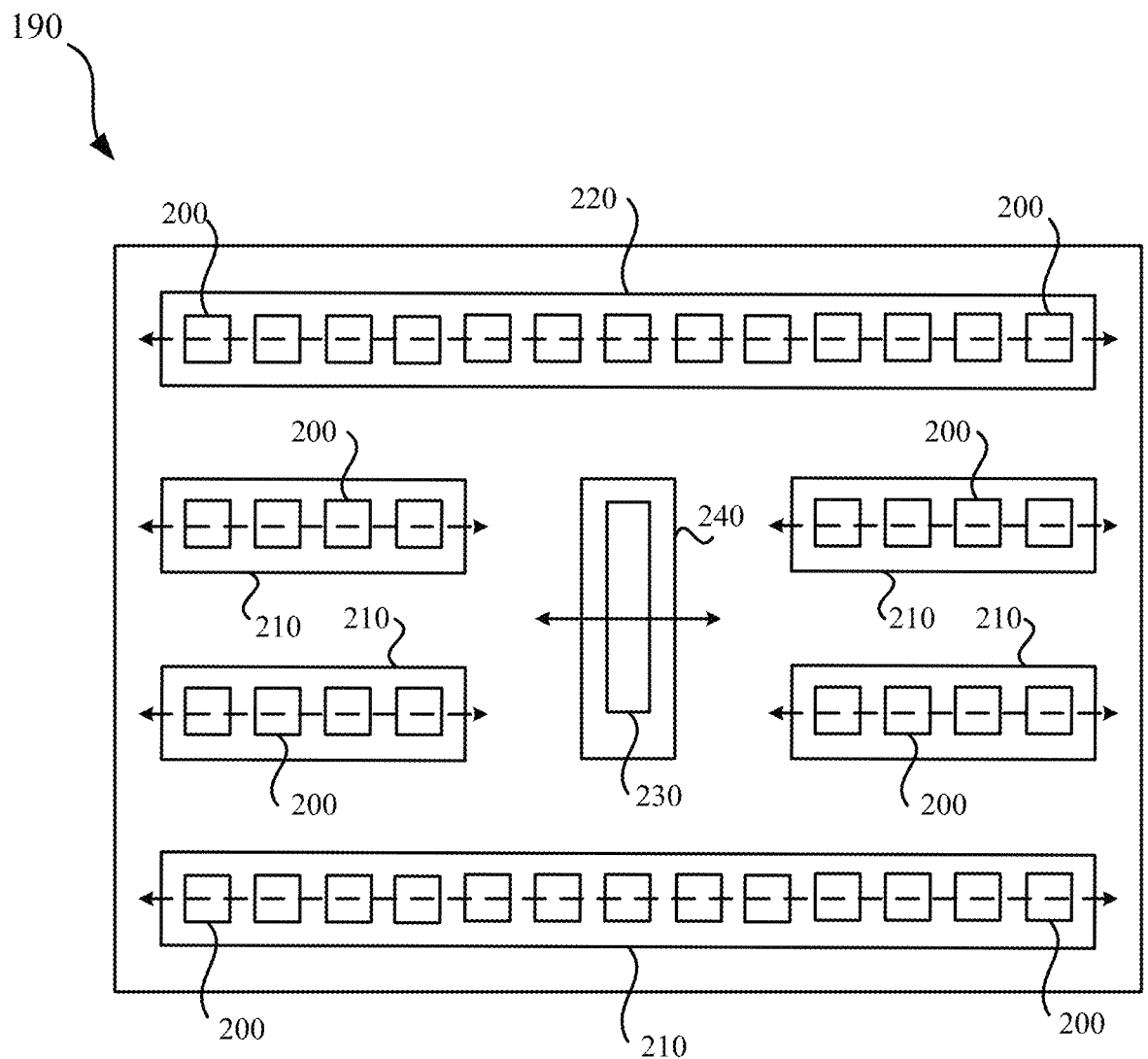
FIG. 2 illustrates a simplified view of a tracking system on a cargo table.
Figure 3:
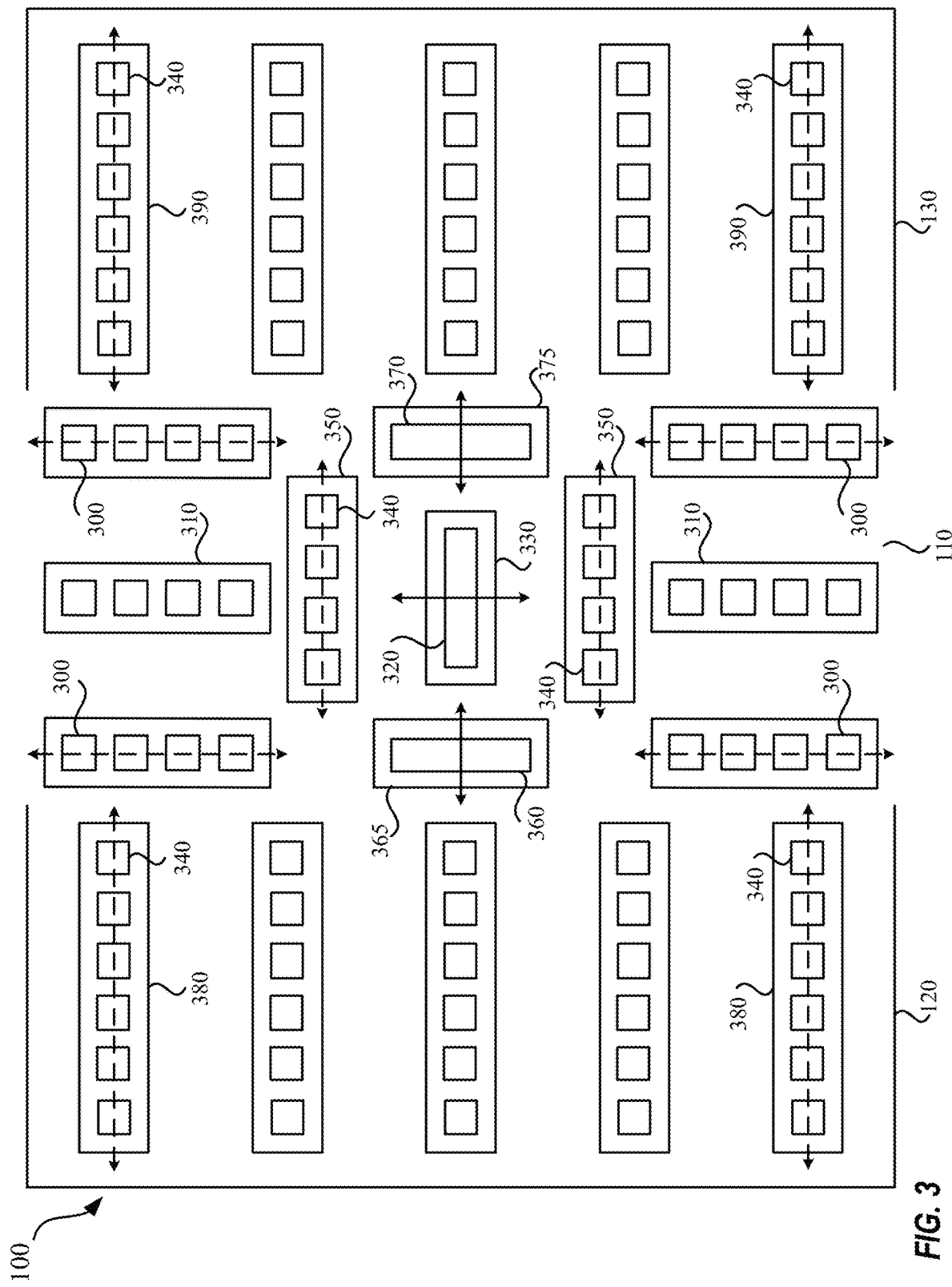
FIG. 3 illustrates a simplified view of a tracking system within a cargo railcar.
Figure 4A:
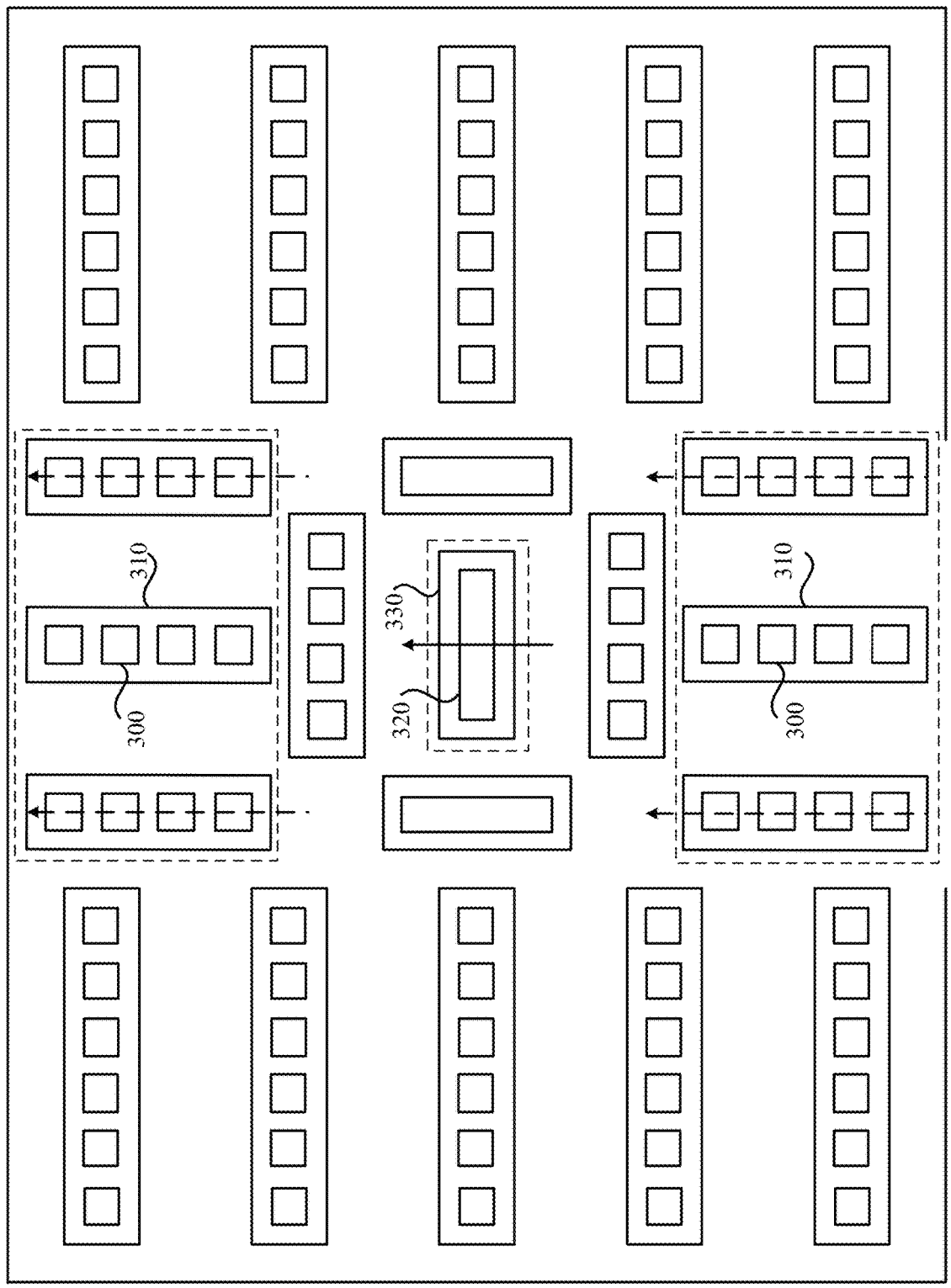
FIGS. 4A-H illustrate the operation of the various components of the railcar for loading cargo thereinto.
Figure 4B:
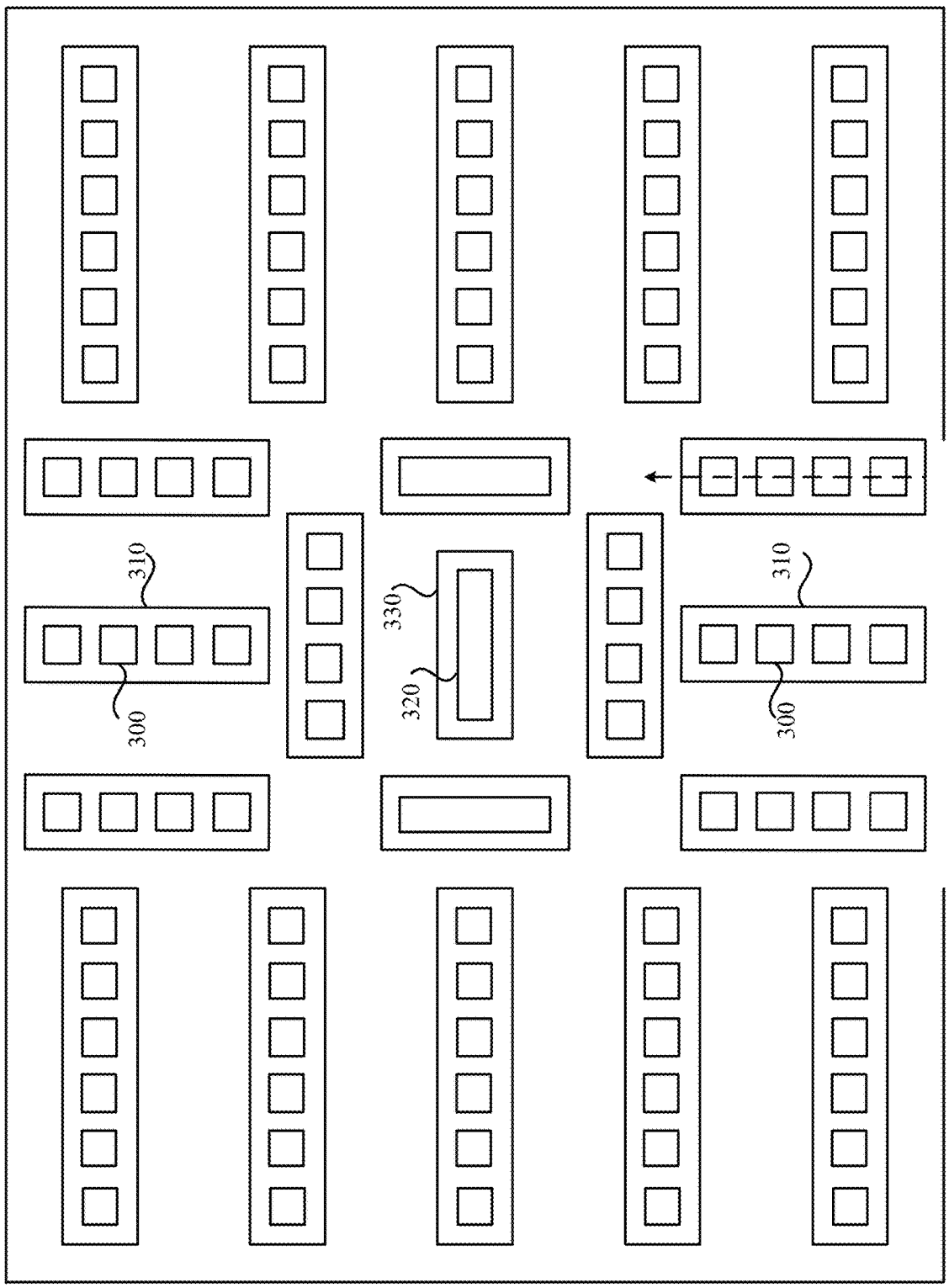
Figure 4C:
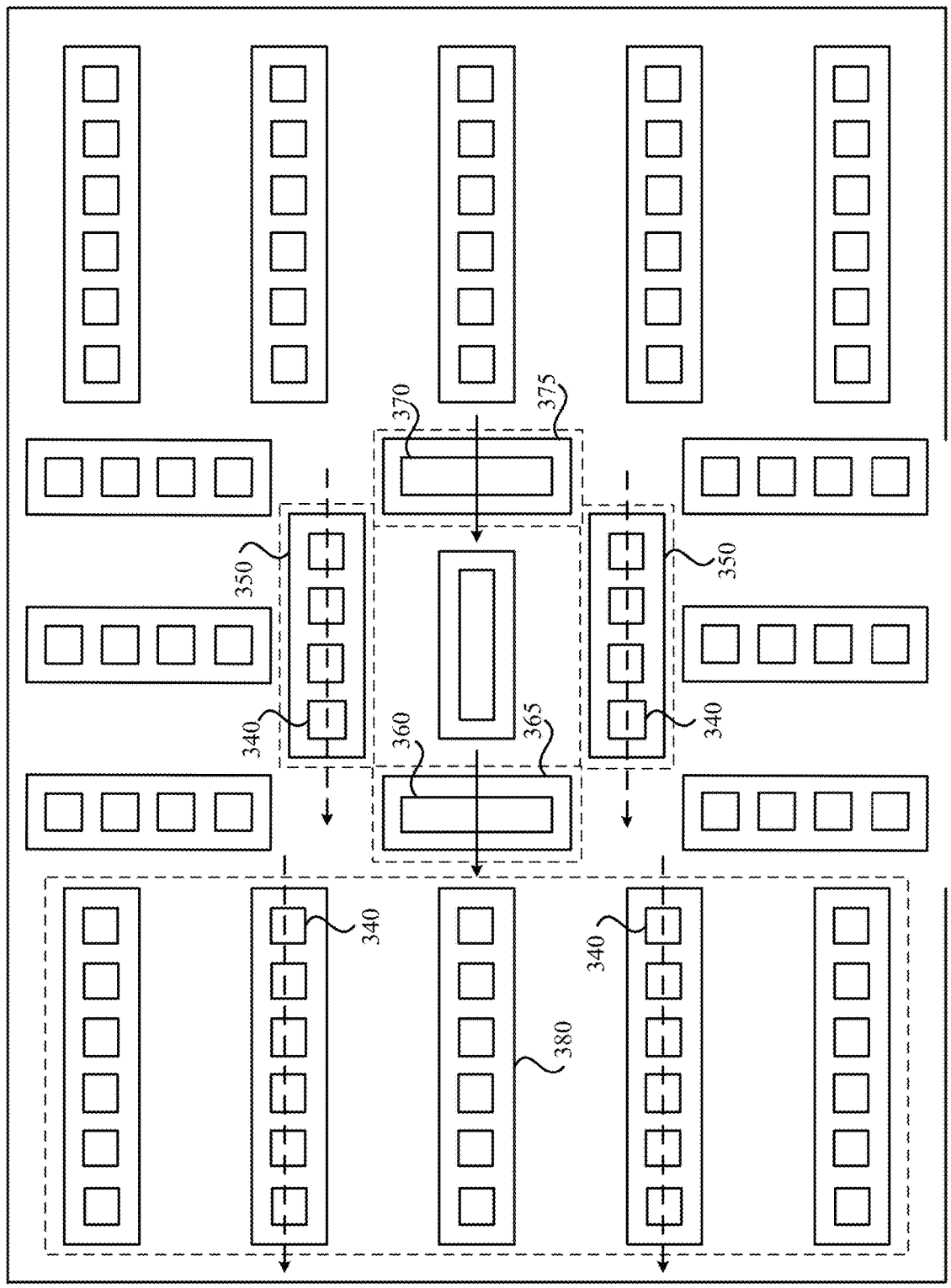
Figure 4D:
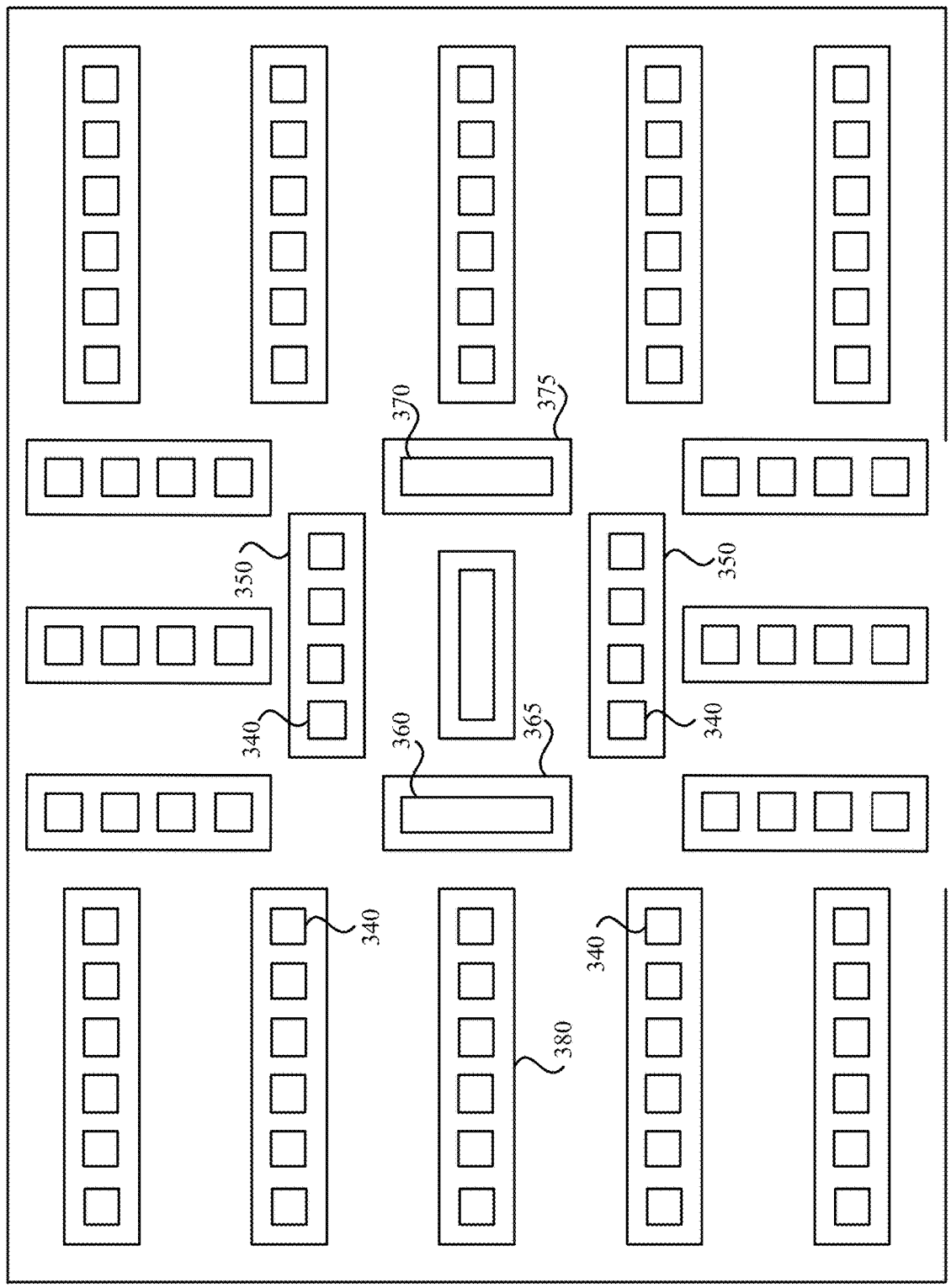
Figure 4E:
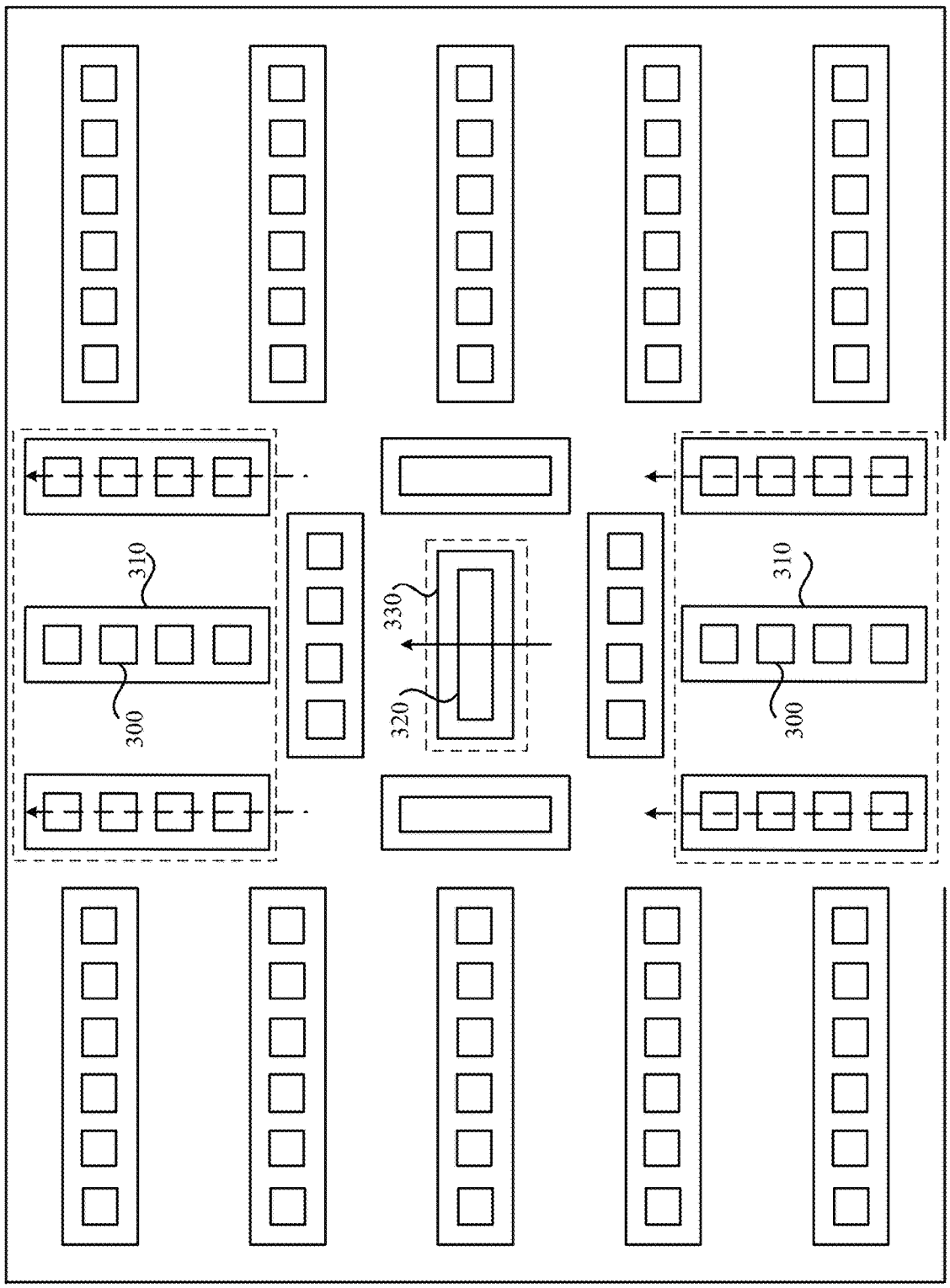
Figure 4F:
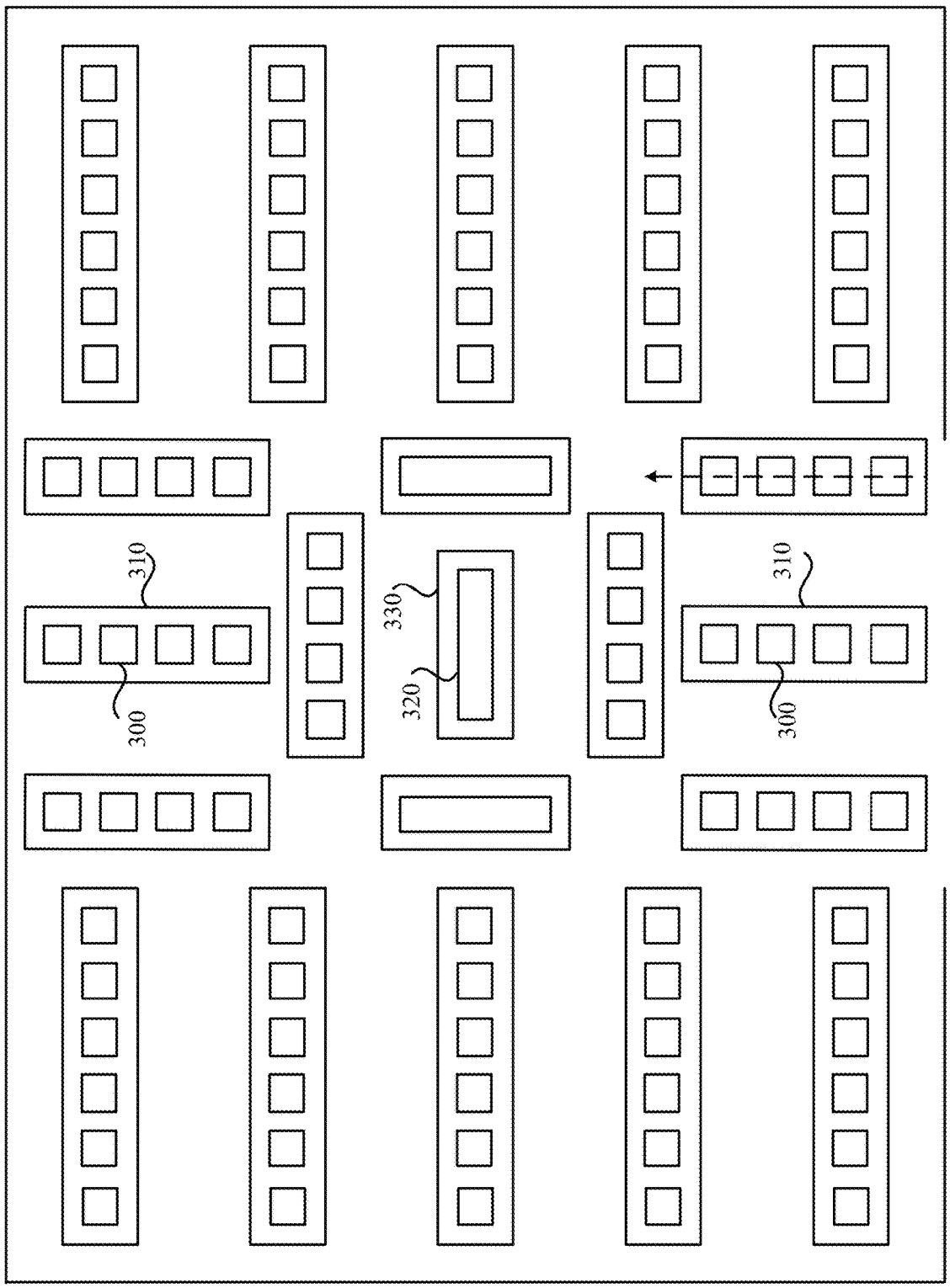
Figure 4G:
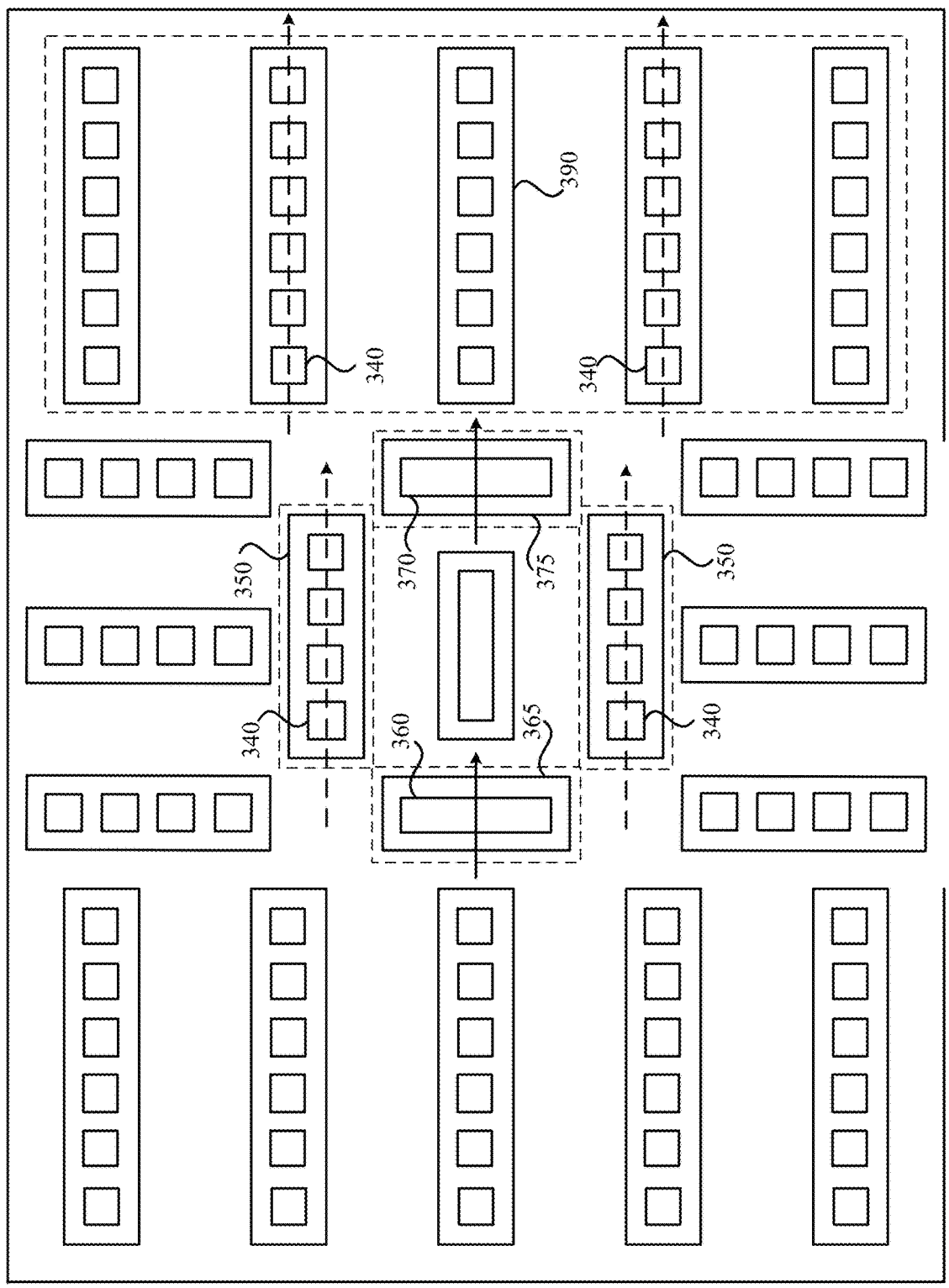
Figure 4H:
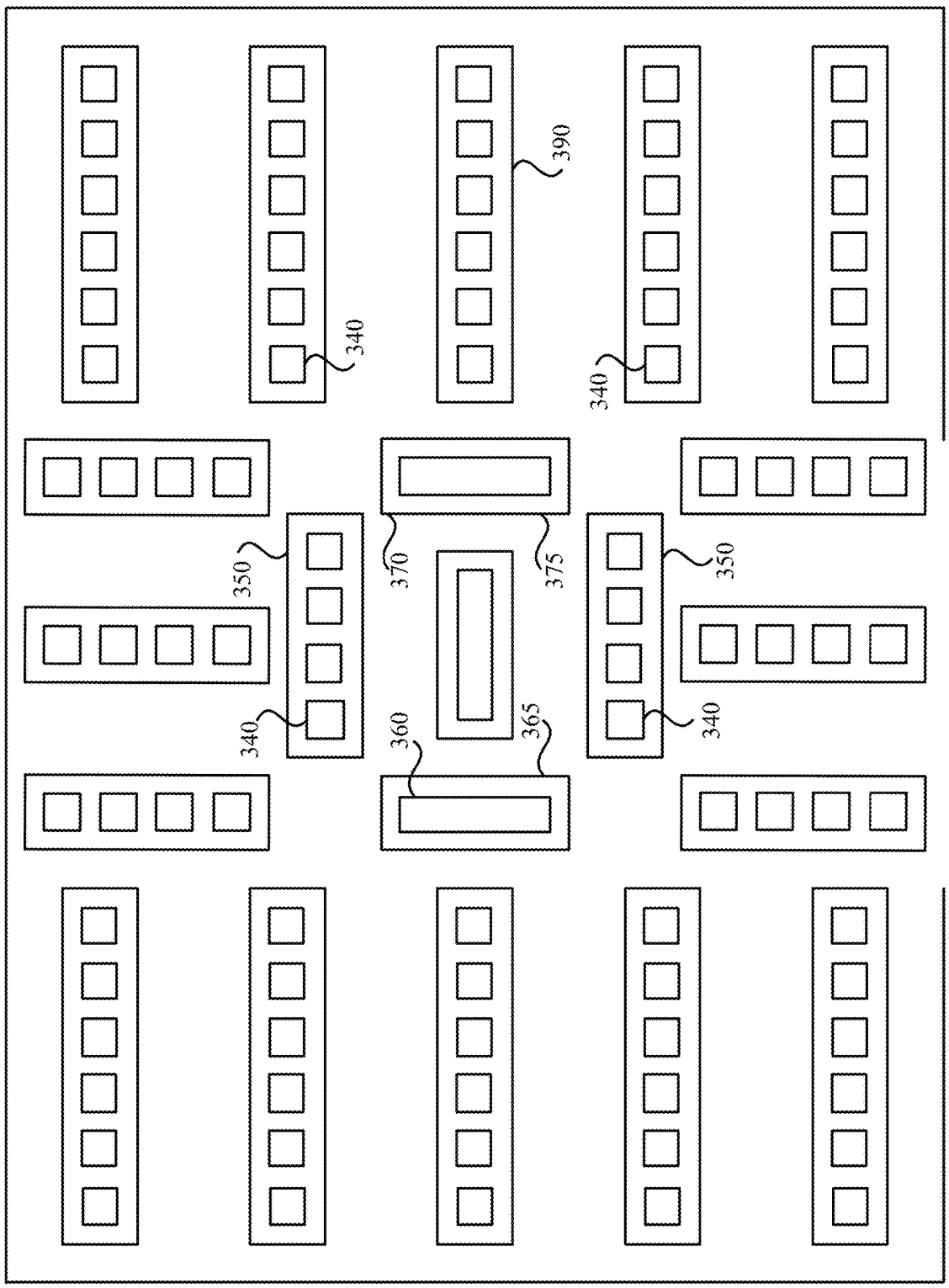

The powered rollers 320, 360 may function the same as those described with respect to FIG. 3 and may be located, configured and oriented in approximately the same manner. The first powered roller 320 is to assist with moving cargo into or out of either side of the railcar 600 and the second powered rollers 360 are to assist with moving cargo to the front or back of the railcar 600.

The first and second sections 120, 130 of the railcar 600 may include a plurality of the second retractable rollers 340 within the track assemblies 380, 390. It should be noted that only a few of the rollers 340 and a few of the assemblies 380, 390 are labeled for ease of illustration. The track assemblies 380, 390 may function the same as those described with respect to FIG. 3 and may be located, configured and oriented in approximately the same manner.

It should be noted that the number of roller ball track assemblies 500 and the number of roller track assemblies 380, 390 may depend on the cargo being loaded thereinto. For example, the heavier the load, the more track assemblies 500, 380, 390 may be utilized.

Figure 7A:
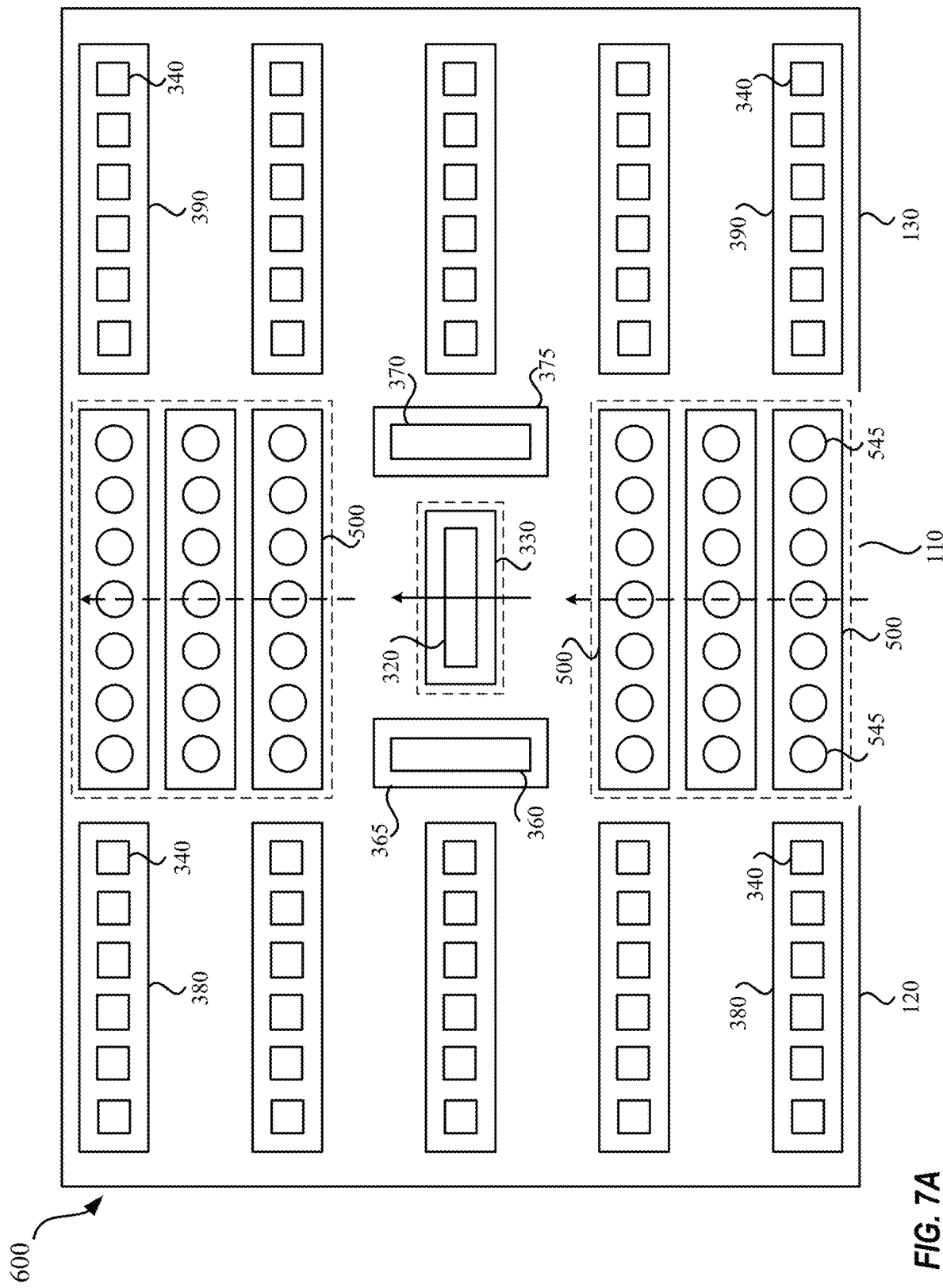
FIGS. 7A-H illustrate the operation of the various components of the railcar when loading cargo into the railcar, according to one embodiment.

FIGS. 7A-H illustrate the operation of the various components of the railcar 600 when loading cargo into the railcar 600. For ease of illustration the components that have been activated are surrounded with a dotted line box. FIG. 7A illustrates the actions to be taken when cargo is being moved into the railcar 600 from a cargo platform 170 (located on right side of railcar 600). The airbag section associated with the roller ball track assemblies 500 is inflated so that the roller balls 545 extend through the floor. The powered roller 320 is activated in a first direction which causes the airbags to inflate so that the roller 320 extends through the floor and then rotates in the first direction (to the left) as indicated by the solid arrow to assist in moving the cargo entering the right side (open door) of the railcar 600 to the left side (toward closed door) of the railcar 600. The roller balls 545 will rotate in the first direction (to the left) as indicated by the dashed arrow as the cargo traverses thereover.

Figure 7B:
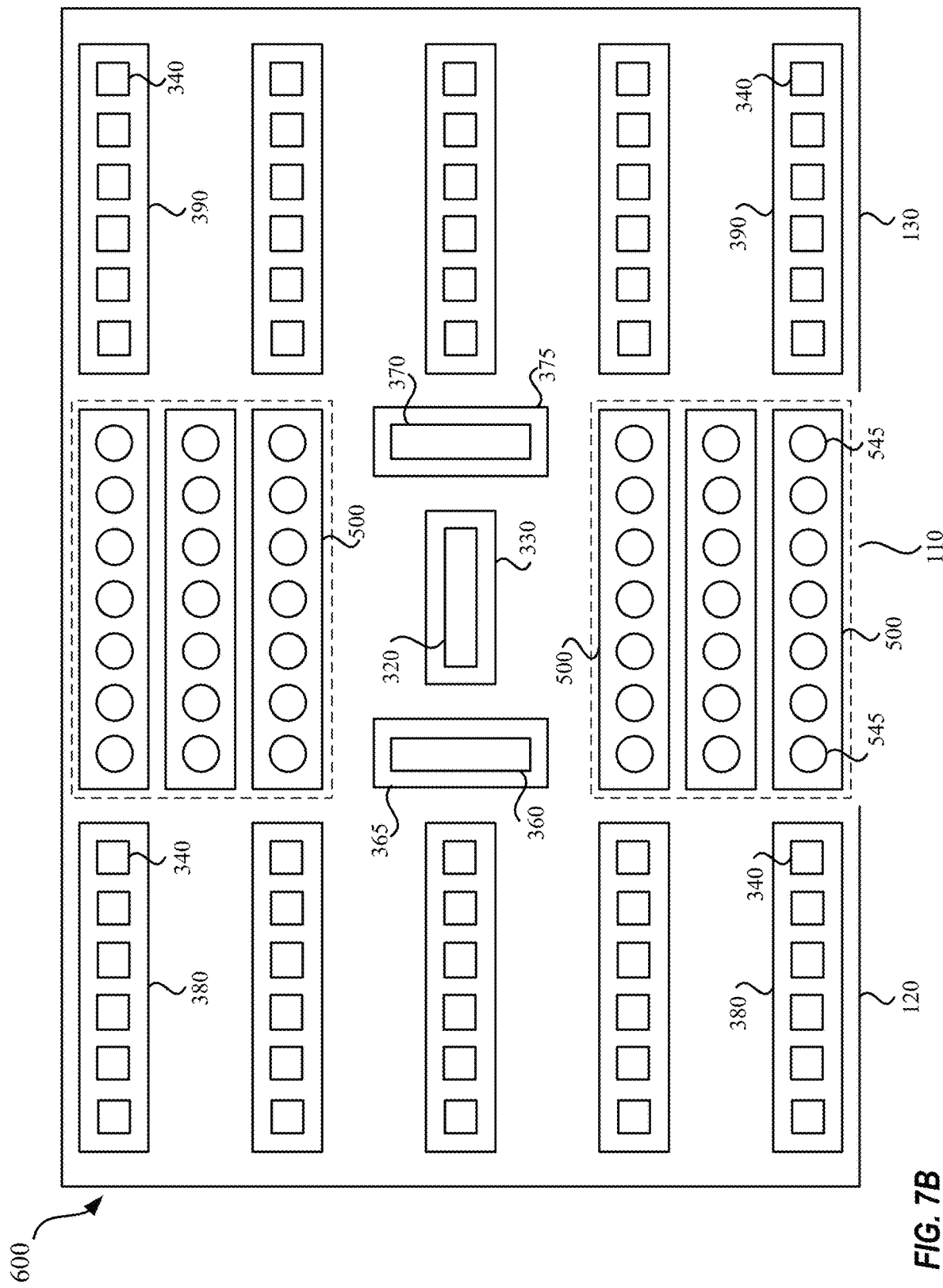

FIG. 7B illustrates the actions to be taken once the cargo has been moved into the railcar 600 from the cargo platform 170. The powered roller 320 is turned off so that roller 320 stops rotating and the airbag associated with the housing 330 is deflated so that the roller 320 retracts into the floor. It should be noted that no action is taken on the roller ball assemblies 500 (the airbag sections remain inflated and the roller balls 545 remain extending through the floor).

Figure 7C:
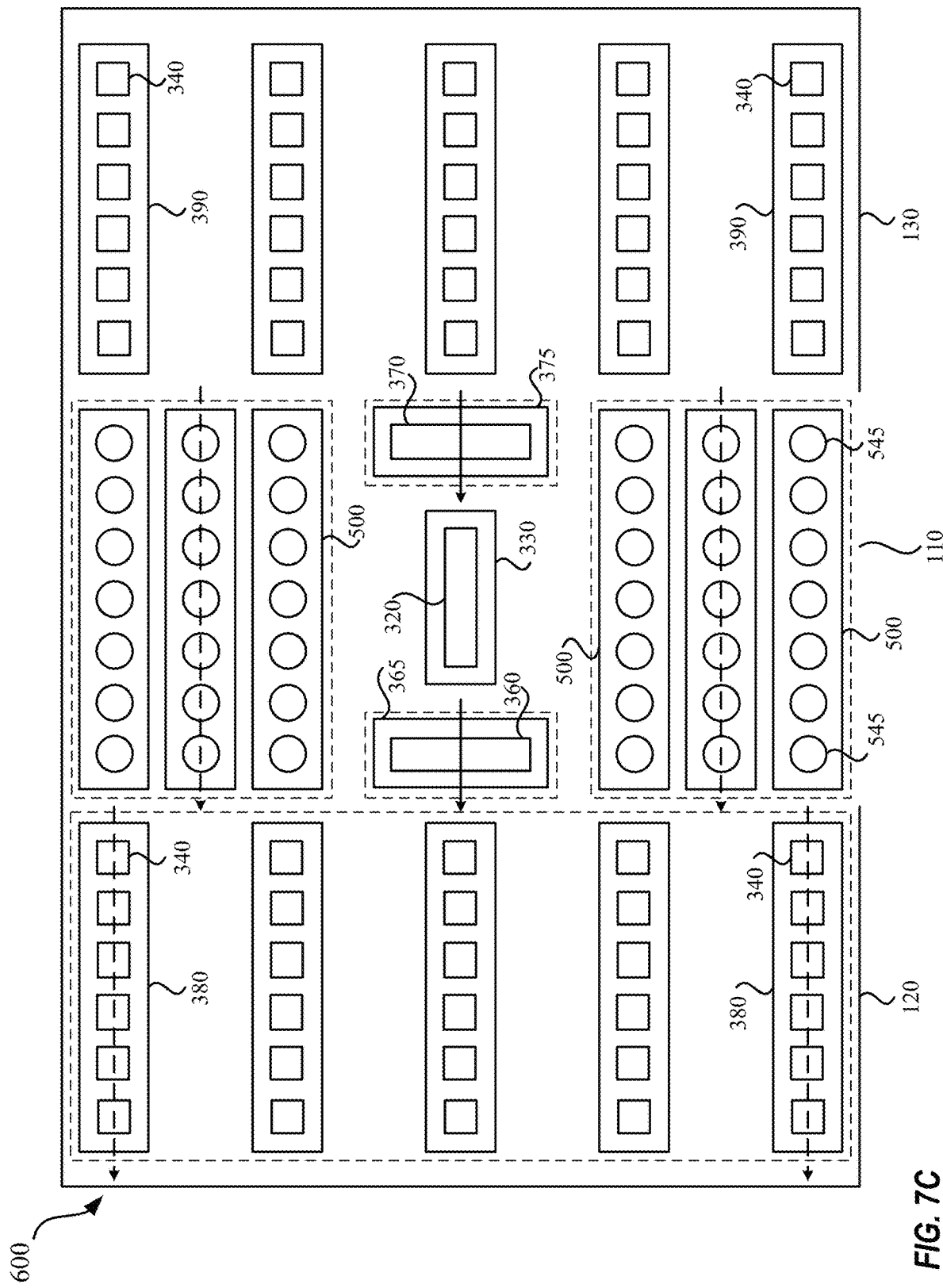

FIG. 7C illustrates the actions to be taken to move the cargo from the center of the railcar to the back of the railcar (to bottom of page as illustrated). The airbag sections for the assemblies 380 are inflated and the rollers 340 extend through the floor. The powered rollers 360, 370 are activated in a first direction which causes the airbags to inflate so that the rollers 360, 370 extends through the floor and then rotate in the first direction (to the back) as indicated by the solid arrow to assist in moving the cargo to the back of the railcar 600. The roller balls 545 and the rollers 340 will rotate in the first direction (to the back) as indicated by the dashed arrow as the cargo traverses thereover. It should be noted that the actions depicted in FIGS. 7B and 7C could be taken at substantially the same time, in which case FIG. 7B would not be required and it would proceed from FIG. 7A to 7C.

Figure 7D:
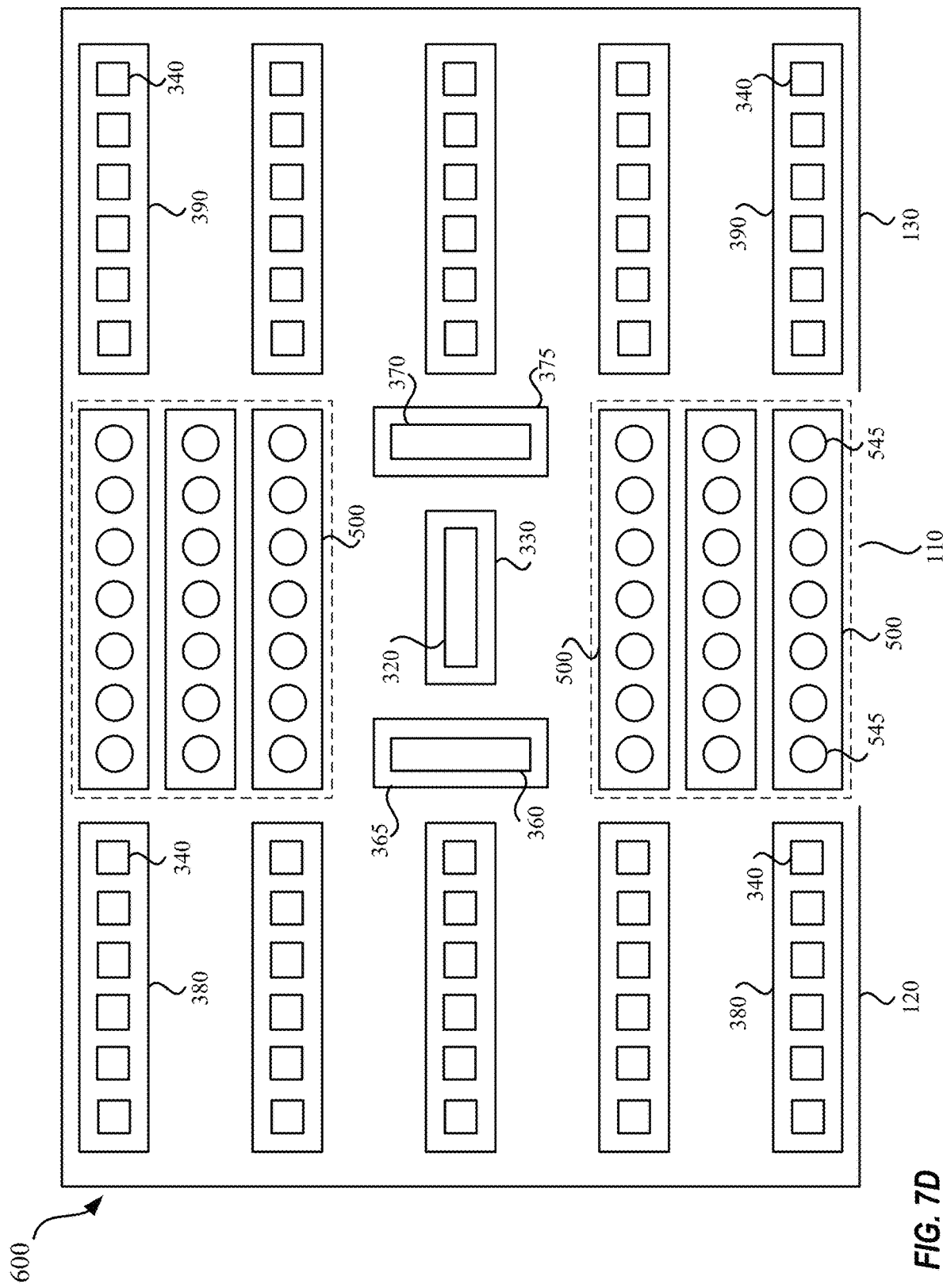

FIG. 7D illustrates the actions to be taken once the cargo has been moved to the back of the railcar 100. The powered rollers 360, 370 are turned off so that rollers 360, 370 stop rotating and the airbags associated with the housings 365, 375 are deflated so that the rollers 360, 370 retract into the floor. Furthermore, the airbag section associated with the assemblies 380 is deflated so that the rollers 340 retract into the floor. It should be noted that no action is taken on the roller ball assemblies 500 (the airbag sections remain inflated and the roller balls 545 remain extending through the floor).

Figure 7E:
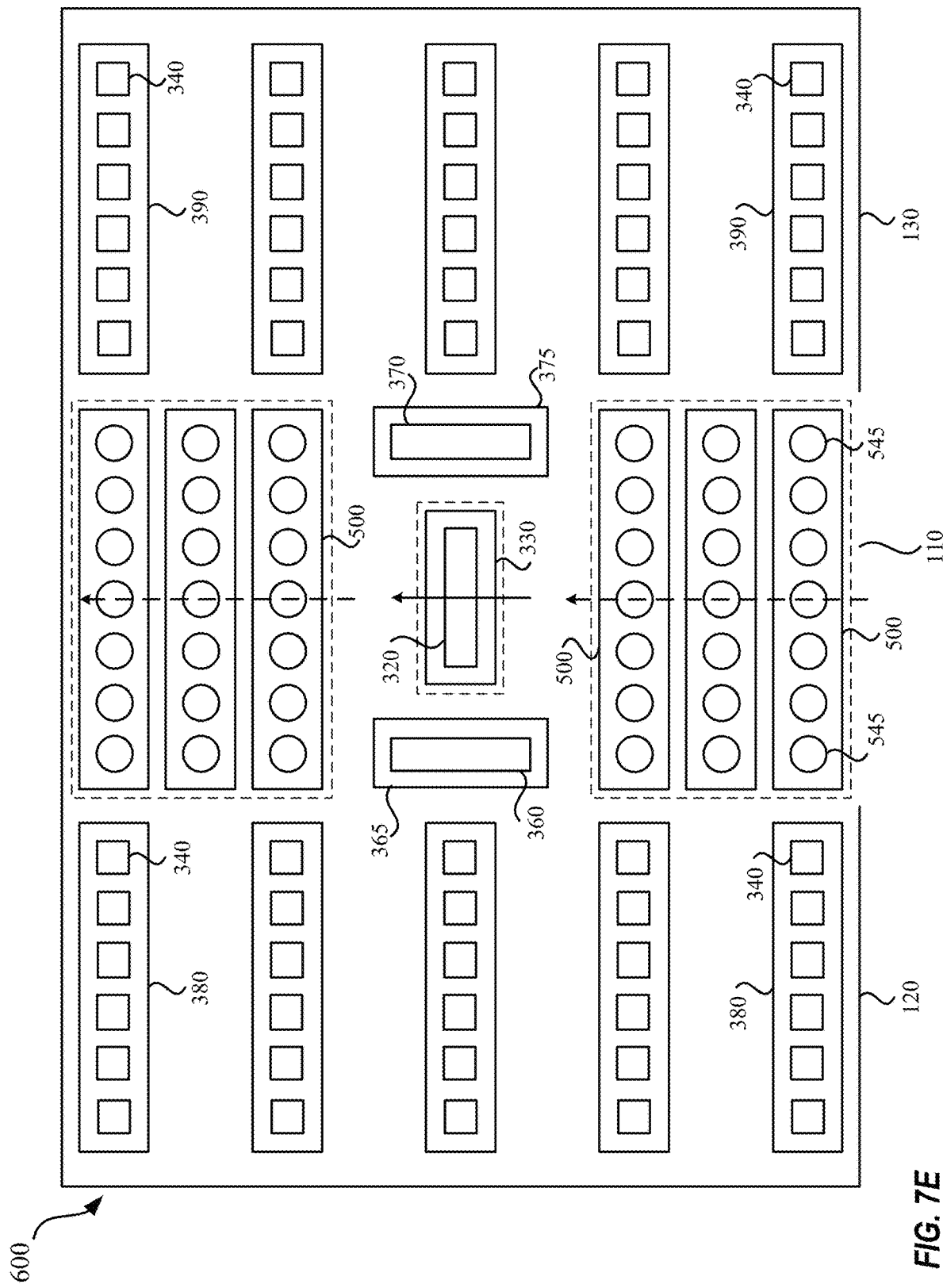

After the cargo has been moved to the back, additional cargo will be loaded into the railcar 500. FIG. 7E illustrates the steps taken to load cargo into the center (same as illustrated in FIG. 7A). It should be noted that the actions depicted in FIGS. 7D and 7E could be taken at substantially the same time, in which case FIG. 7D would not be required and it would proceed from FIG. 7C to 7E.

Figure 7F:
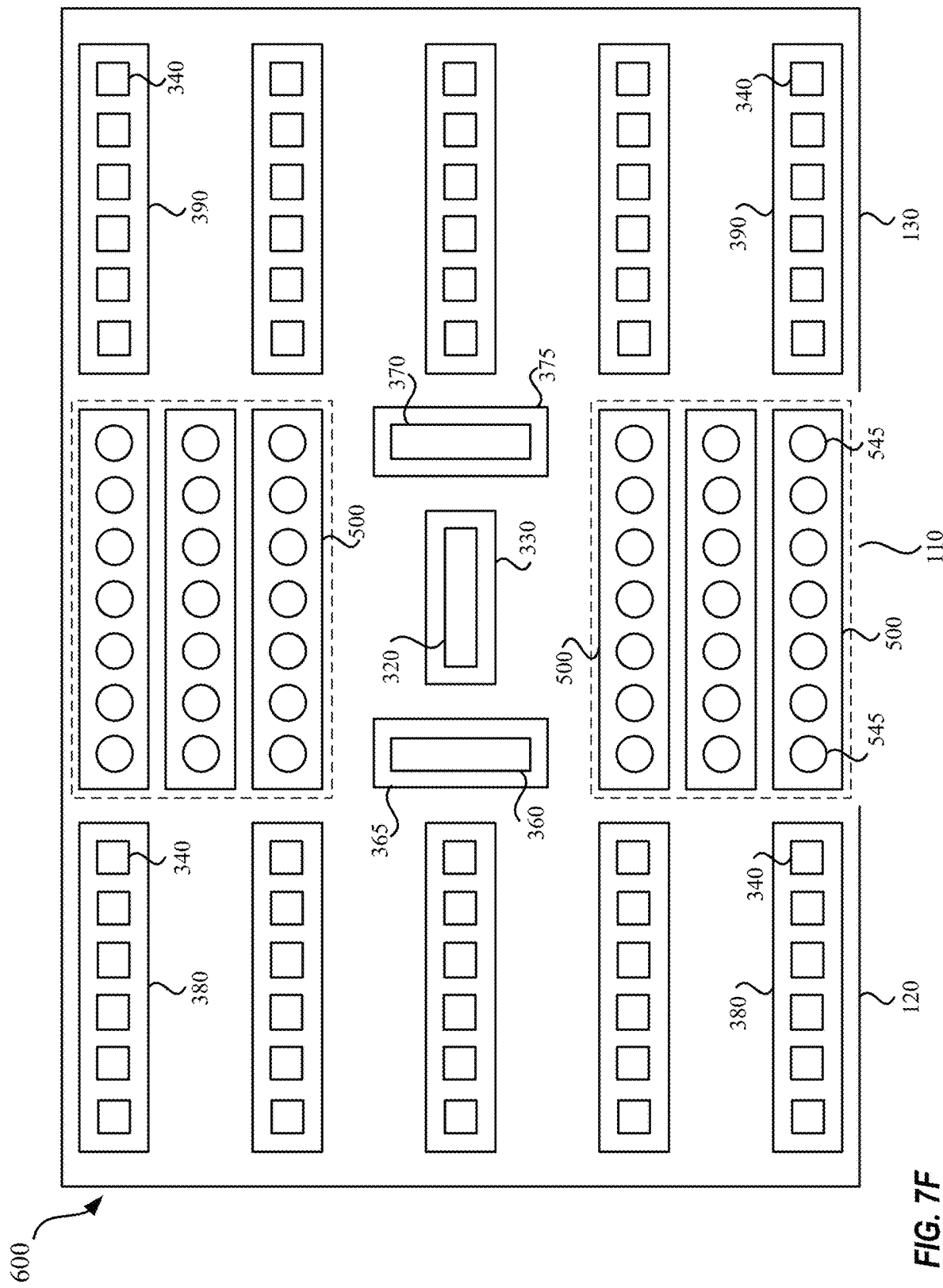
Figure 7G:
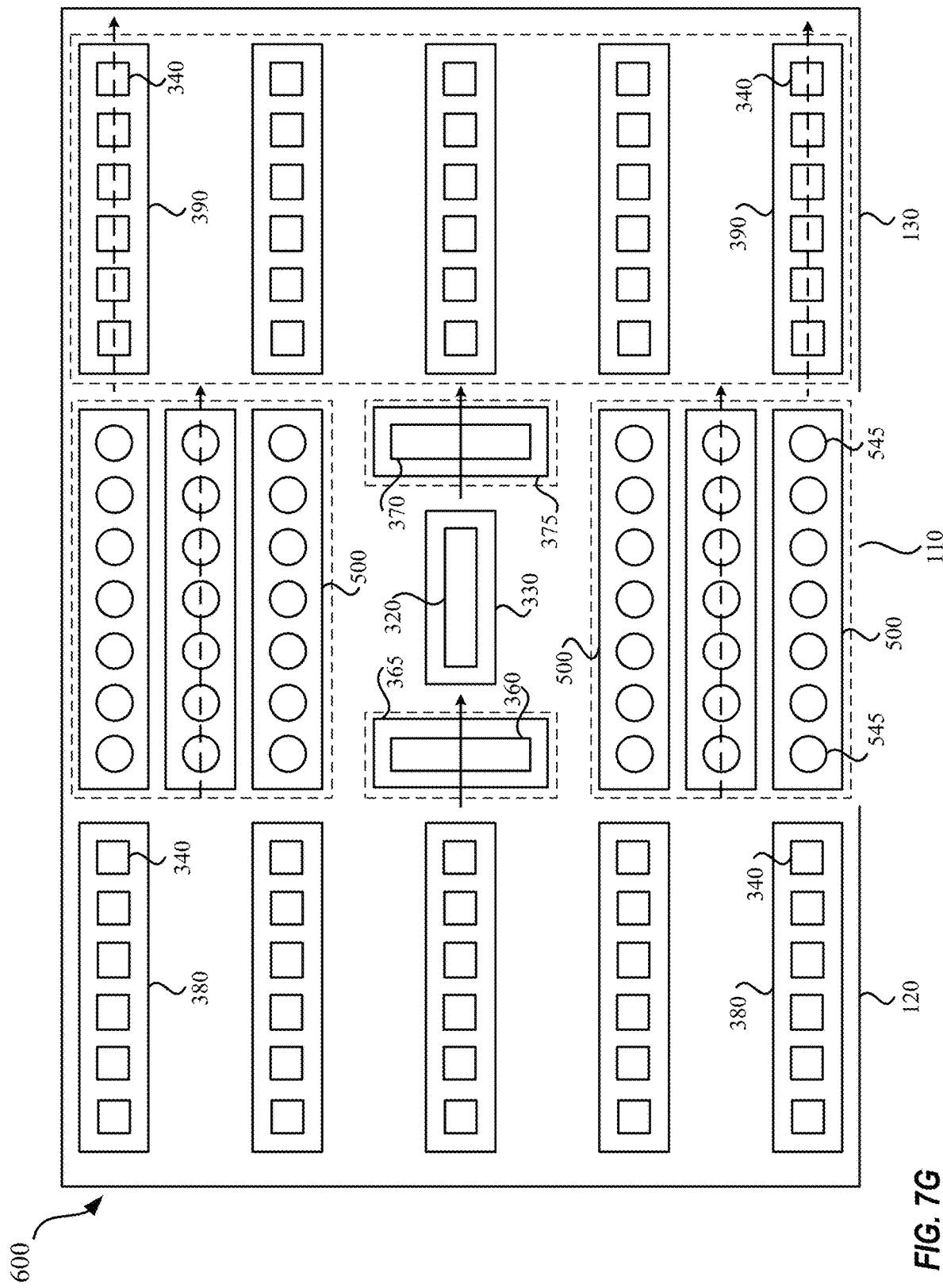

FIG. 7F illustrates the steps taken after the cargo has entered the railcar (same as illustrated in FIG. 7B). FIG. 7G illustrates the actions to be taken to move the cargo from the center of the railcar to the front of the railcar (to top of page as illustrated). The airbag sections for the assemblies 390 are inflated so that the rollers 340 extend through the floor. The powered rollers 360, 370 are activated in a second direction which causes the airbags to inflate so that the rollers 360, 370 extend through the floor and then rotate in the second direction (to the front) as indicated by the solid arrow to assist in moving the cargo to the front of the railcar 600. The roller balls 545 and the rollers 340 will rotate in the second direction (to the front) as indicated by the dashed arrow as the cargo traverses thereover. It should be noted that the actions depicted in FIGS. 7F and 7G could be taken at substantially the same time, in which case FIG. 7F would not be required and it would proceed from FIG. 7E to 7G.

Figure 7H:
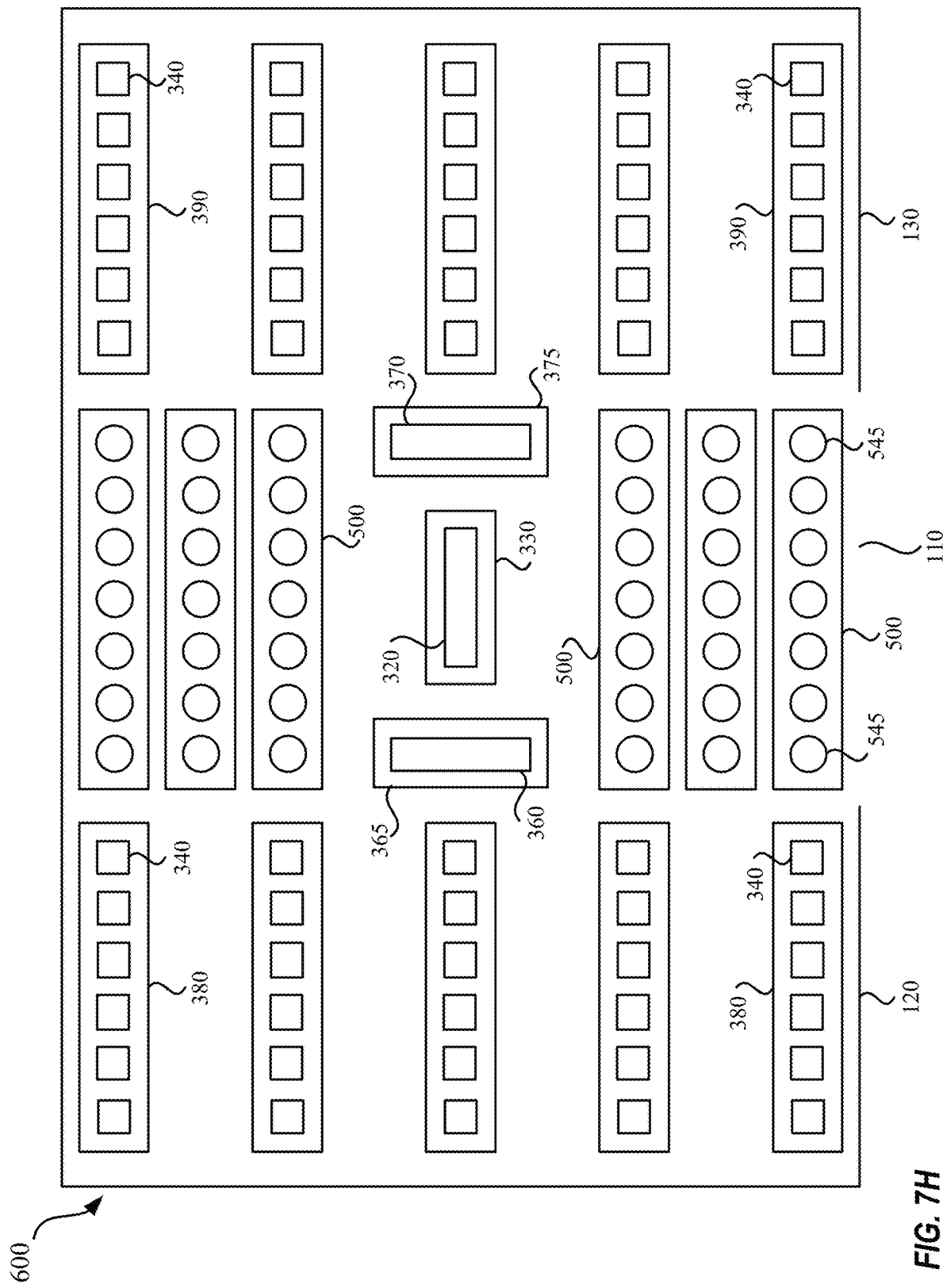

FIG. 7H illustrates the actions to be taken once the cargo has been moved to the front of the railcar 600 and the loading of cargo is complete. The powered rollers 360, 370 are turned off so that rollers 360, 370 stop rotating and the airbags associated with the housings 365, 375 are deflated so that the rollers 360, 370 retract into the floor. Furthermore, the airbags sections associated with the assemblies 500, 390 are deflated so that the roller balls 545 and the rollers 340 retract into the floor.

To remove cargo from the railcar 600, the process is basically reversed. The variation being that when the cargo is loaded in the front or back of the railcar that the powered rollers 360, 370 located in the center of the railcar will not aid in bringing the cargo to the center. Accordingly, moving cargo to the center of the railcar may require manually pulling the cargo over the appropriate rollers 340 that have been activated. Once the cargo is in the center, the powered roller 320 can assist in unloading the cargo from the appropriate side of the railcar.

It should further be noted that as the cargo may be loaded to (or unloaded from) the front and back of the railcar in, for example, an alternating or arbitrary fashion that the roller track assemblies 380, 390 may both be activated (inflated, rollers up) at the same time. The roller ball assemblies 500 may stay up for the entire loading/unloading process. Having all three sections raised at once allows cargo to move in/out and between sections as the user desires. The powered rollers 320, 360, 370 are operated to guide which direction the cargo is moving.

In order to further streamline the process for loading cargo onto the cargo car, the cargo railcar may include a single connector on each side of the cargo railcar for receiving air and a single connection on each side for receiving power and control signals. The railcar may include a solenoid valve for routing the air to the appropriate sections of airbags based on control signals. The railcar may also include an electrical junction box for receiving the power and control signals and routing the signals to the solenoid valve and the appropriate powered rollers.

Figure 8:
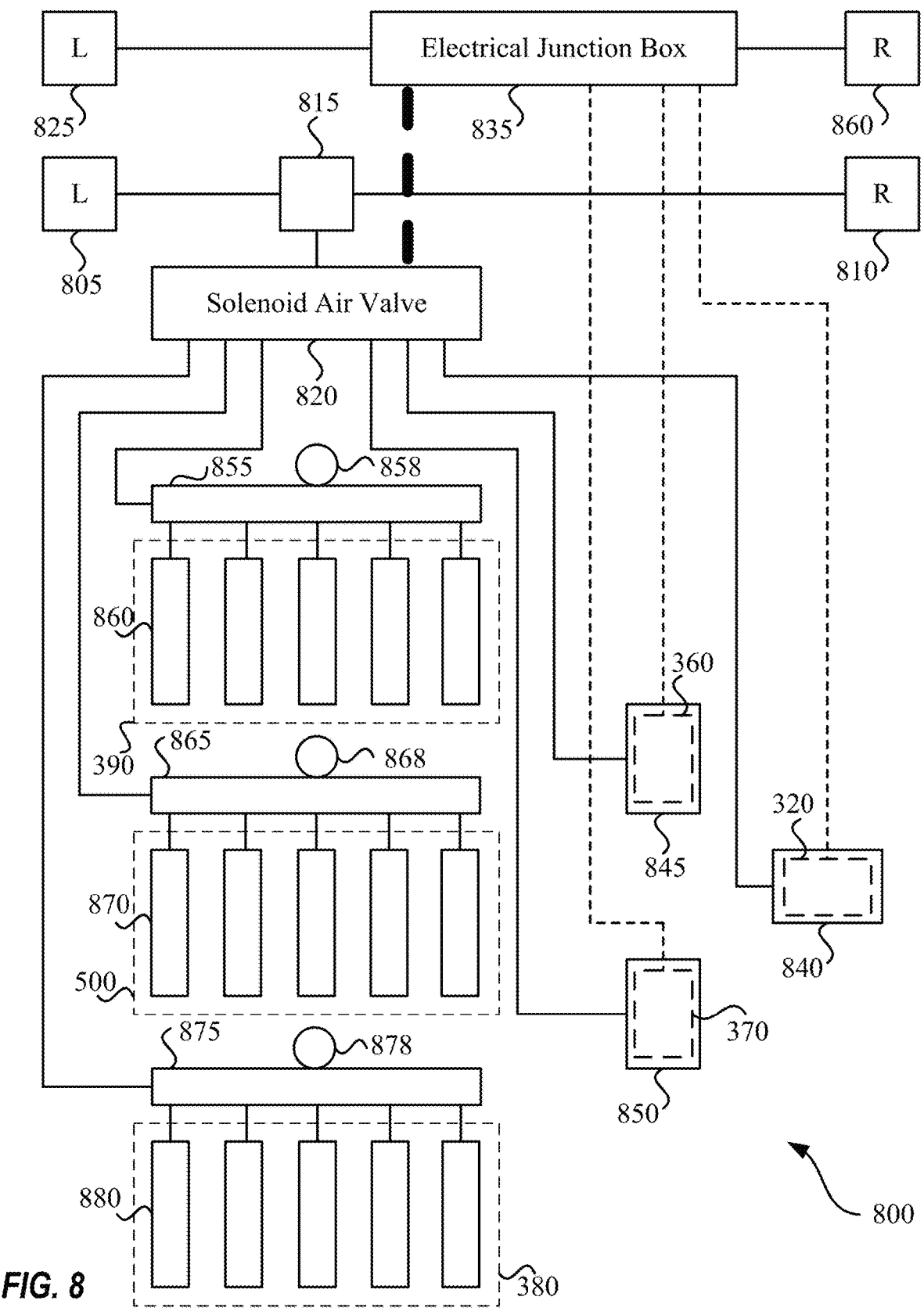
FIG. 8 illustrates an example functional diagram of air and electrical systems of a cargo railcar, according to one embodiment.

FIG. 8 illustrates an example functional diagram of air and electrical systems 800 of a cargo railcar. The cargo railcar includes an air connector (e.g., glad-hand connector) 805, 810 on each side thereof to receive a pneumatic supply line to connect the railcar to an air supply source located on the cargo bay. Each side of the cargo railcar also includes a data connector (multi-pin connector) 825, 830 for receiving power and control signals from a control unit on the cargo bay. The use of the air connectors 805, 810 and data connectors 825, 830 on each side of the railcar enables the railcar to be connected to a cargo bay regardless of what side of the railcar the cargo bay is on.

Each of the air connectors 805, 810 are connected to a shuttle valve 815 that provides air received from the appropriate connector 805, 810 to a solenoid air valve 820. The solenoid air valve 820 is capable or routing air to airbag sections (associated with roller tracks 380, 390 and/or roller ball tracks 500) and/or airbags (associated with powered rollers 320, 360, 370) based on control signals received thereby. Each of the data connectors 825, 830 is connected to an electrical junction box 835. The electrical junction box 835 provides power and control signals to the solenoid air valve 820 and the powered rollers 320, 360, 370. The control signals to the solenoid air valve 820 controls the operation of the solenoid air valve 820 by defining which valves to open and close based on which airbag sections and/or airbags should be inflated or deflated. The manner in which the power is applied to the powered rollers 320, 360, 370 may control the direction of the powered rollers 320, 360, 370.

The solenoid air valve 820 connects to various airbag sections and airbags via different ports. As illustrated, the solenoid air valve 820 has six external ports (but is not limited thereto) that it may provide air from based on whether an associated valve is open or closed. Three of the ports are connected to airbags 840, 845, 850 associated with the powered rollers 320, 360, 370. It should be noted that in order for the powered rollers 320, 360, 370 to operate that they must be raised (airbags 840, 845, 850 inflated) and the appropriate signals must be provided to turn in the appropriate direction. That is, the electrical junction box 835 needs to provide power to the appropriate powered roller(s) 320, 360, 370 and also provide commands to the solenoid air valve 820 to provide air to the appropriate airbag(s) 840, 845, 850.

Three of the ports are connected to track isolation valves 855, 865, 875 that are associated with different sections of the railcar (front, center, back). Each of the track isolation valves 855, 865, 875 are to provide air to a plurality of rows (5 illustrated) of airbags 860, 870, 880 that are located within the roller tracks 380, 390 or roller ball tracks 500. It should be noted that the number of rows that the track isolation valves 855, 865, 875 provide air to is in no way intended to be limited to any number and that each of the track isolation valves 855, 865, 875 need not provide air to the same number of rows (rather each can provide air to a desired number of rows). For ease of illustration only a few of the airbags 860, 870, 880 are identified and the tracks 380, 390, 500 that the airbags 860, 870, 880 are located within are simply illustrated as a dotted box for the entire section. It should be noted that while each row is illustrated as a single airbag that it may be more than one track assembly and thus more than one airbag in the row. In such an event, the airbags within the row may be connected together.

The track isolation valves 855, 865, 875 may include quick exhaust valves 858, 868, 878 that enable the air within the associated airbags 860, 870, 880 to be quickly drained when deactivated (when air is no longer being provided to the associated track isolation valves 855, 865, 875). Quickly draining the air from (deflating) the airbags 860, 870, 880 enables the rollers 340 and/or roller balls 545 to be retracted quickly when those sections are deactivated. The quick exhaust valves 858, 868, 878 may simply be a port that is closed when the track isolation valves 855, 865, 875 are receiving air that is open when no air is being received.

According to one embodiment, the system 800 may inflate the roller tracks 380, 390 and/or roller ball tracks 500 without operating the powered rollers 320, 360, 370 to, for example, allow cargo to manually be loaded, unloaded and/or organized. According to one embodiment, the system 800 may limit the operation of the powered rollers 320, 360, 370 to when appropriate ones of the roller tracks 380, 390 and/or roller ball tracks 500 are inflated to, for example, prevent cargo from being forced along the floor where movement (rolling) is not facilitated by the rollers 340 and/or the roller balls 545 being raised. For example, if the roller ball assemblies 500 are not activated none of the powered rollers 320, 360, 370 may be operational.

Figure 9:
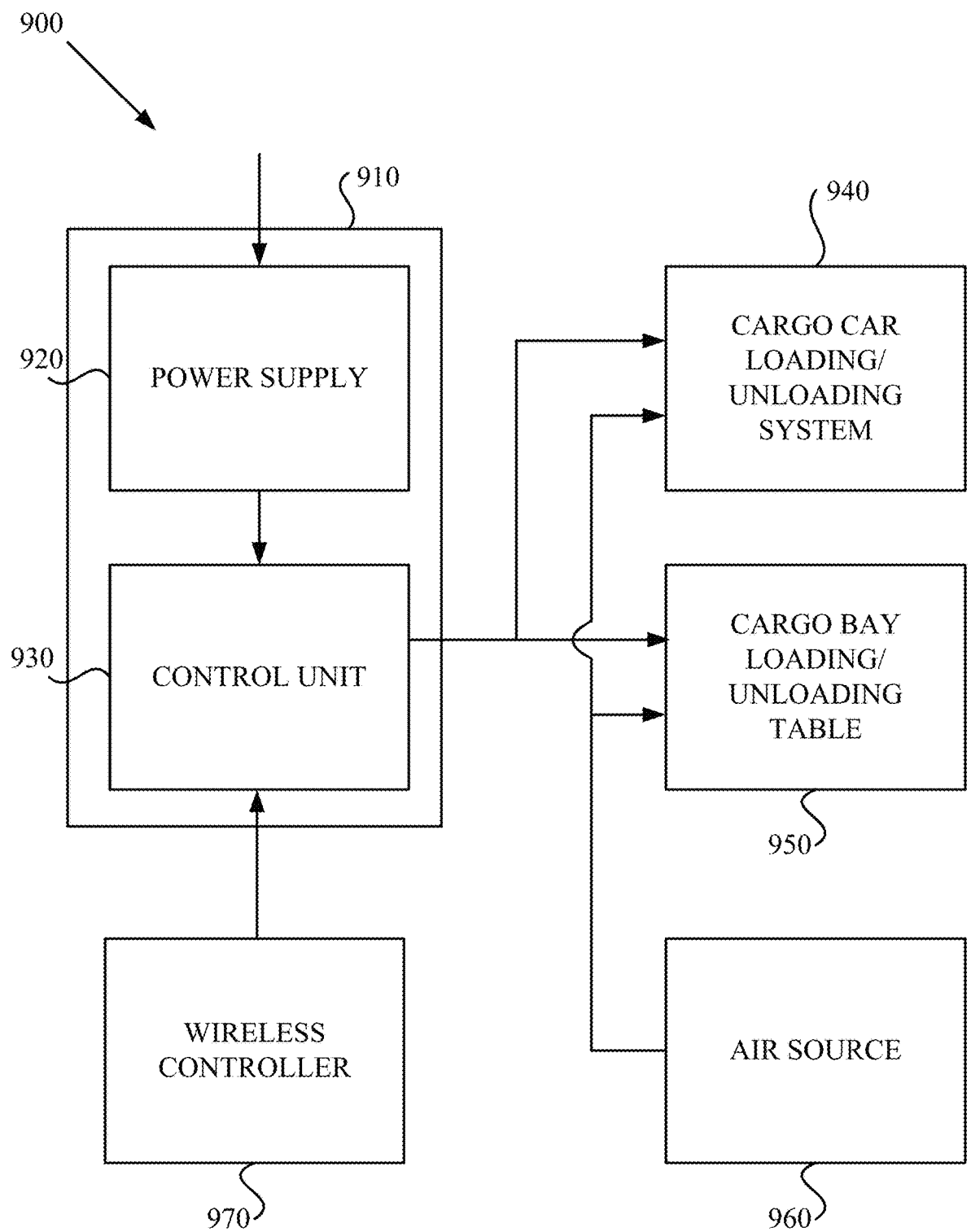
FIG. 9 illustrates an example functional diagram of a system for loading cargo from a cargo bay to a cargo railcar and unloading cargo from the cargo railcar to the cargo bay, according to one embodiment.

FIG. 9 illustrates an example functional diagram of a system 900 for loading cargo from a cargo bay to a cargo railcar and unloading cargo from the cargo railcar to the cargo bay. The system 900 may include a cargo bay station 910, a cargo railcar 940 equipped with track system for loading/unloading (e.g., FIG. 6), a cargo table 950 equipped with track system for loading/unloading, an air supply 960 and a wireless controller 970. The cargo bay station 910 may include a power supply 920 and a control unit 930. The power supply 920 is to convert the AC power (e.g., 120V, 240V) received at the cargo bay to the DC power (e.g., 24V) to operate the cargo railcar 940 and the cargo table 950. The power supply 920 provides the power to the control unit 930. The control unit 930 may include, for example, a wireless receiver, motor drive boards to control the powered rollers, a controller to provide control signals to the solenoid air valves, a fuse panel and control relays. The control unit 920 is connected to the cargo railcar 940 and the cargo table 950 with data and power cables. The cables provide both power and control signals thereto as, for example, described with respect to FIG. 8. The air source 960 is also connected to the cargo railcar 940 and the cargo table 950. The wireless controller 970 is used to provide instructions to the control unit 930 for how to operate the system. The wireless controller 970 may control the operation of both the cargo railcar 940 and the cargo table 950.

The wireless controller 970 may be utilized by an individual moving the cargo as opposed to a person located at the cargo bay station 910. The use of the wireless controller 970 enables decisions about appropriate actions to be taken to move the cargo to be made at the location where the cargo is actually being moved. This direct control of the system enables more accurate and timely instructions to be provided. The wireless controller 970 may be capable of linking to a specific cargo bay station 910 to exclusively work therewith and prevent interference.

Figure 10:
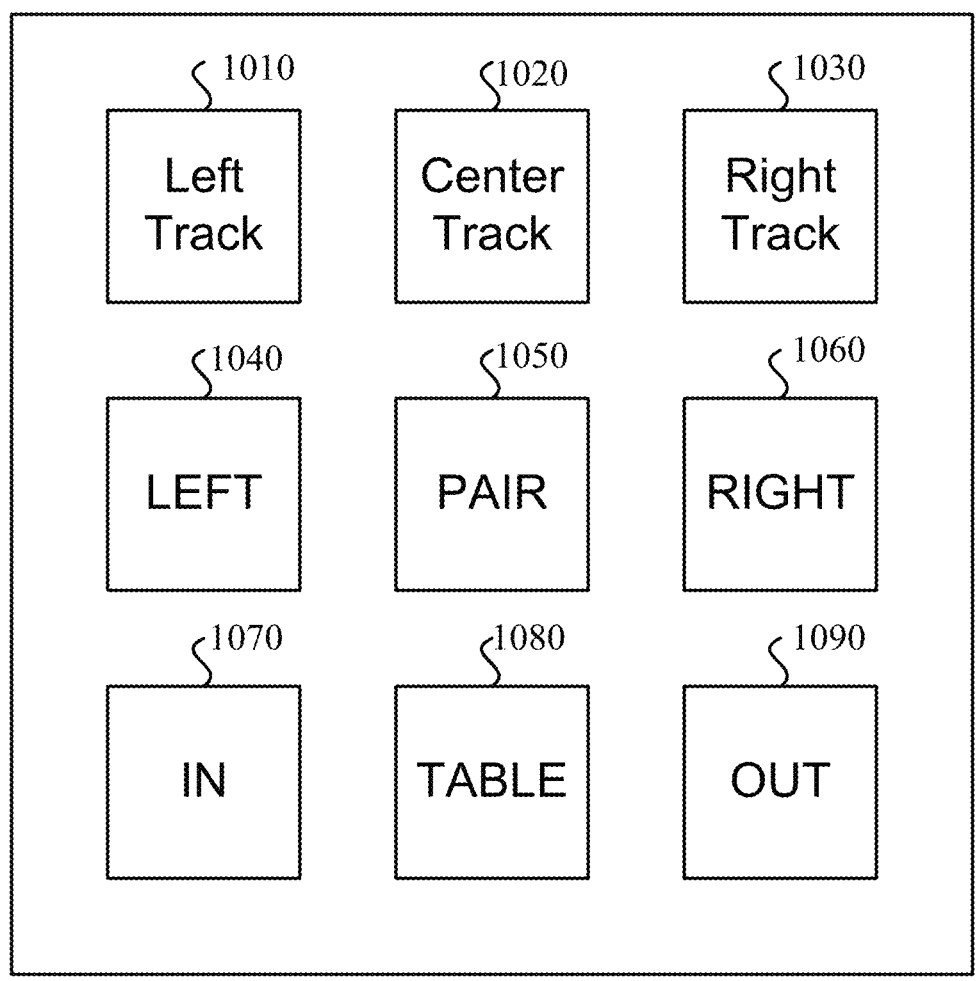
FIG. 10 illustrates an example user interface for the wireless controller used in the operation of the cargo loading/unloading system, according to one embodiment.

FIG. 10 illustrates an example user interface for the wireless controller 970 used in the operation of the cargo loading/unloading system 900. The wireless controller 970 may include buttons for pairing the wireless controller with a cargo bay station (PAIR) 1050, for controlling the tracks (e.g., inflating or deflating the airbags) in the various sections of the railcar including LEFT TRACK 1010, CENTER TRACK 1020, and RIGHT TRACK 1030, for controlling the tracks on the TABLE 1080, and for controlling the direction that the powered rollers move the cargo including LEFT 1040, RIGHT 1060, IN 1070 and OUT 1090. It should be noted that the user interface is not limited to the arrangement of the buttons, the specific titles of the buttons, the number of buttons and/or the exact operations to be performed with the buttons as illustrated. For example, arrows can be used instead of the directions the cargo is to be moved. Furthermore, the term buttons should be interpreted to be include various types of physical buttons, locations on a touch screen, switches, toggles or the like that could be used to select the appropriate action by depressing, touching, tapping, flipping or the like the location associated with the action.

When a user is ready to use the system 900 they may power on the wireless controller 970 and depress (touch, tap) the pair button 1050 in proximity to any cargo bay station 910 in order to pair the two together. Once they are paired no other wireless controller 970 can be connected to the cargo bay station 910 and the wireless controller 970 cannot be connected to another cargo bay station 910 until the power is cycled again. This allows two systems 900 to work next to each other without the wireless controller 970 from one interfering with an adjacent one. It should be noted that the wireless controller 970 and the cargo bay station 910 pairing will ensure that the wireless controller 970 operates correctly based on the orientation of the railcar with respect to the cargo bay. For example, as IN on one side of the railcar is the same direction as OUT on other side the pairing will ensure that when IN 1070 is depressed that the appropriate action is taken for the side of the cargo bay that the cargo bay station 910 is located with respect to the cargo railcar.

When a user desires to raise the rollers or roller balls associated with a certain section of the railcar or the table, they can depress the associated button 1010, 1020, 1030, 1080 to, for example, inflate the airbag sections associated therewith. The airbag sections will stay inflated until the user depresses the associated button 1010, 1020, 1030, 1080 again at which point the airbag sections will deflate and the rollers or roller balls associated therewith will be retracted.

When the user wishes to move cargo in a certain direction they can depress the associated button 1040, 1060, 1070, 1090 to activate the associated powered rollers, which includes inflating the appropriate airbag and rotating the roller in the appropriate direction. For safety reasons, the powered rollers will only be active when the button is depressed. As soon as the button is no longer depressed (or not enough pressure is applied) the rotation of the rollers will stop. This provides the user with precise control of the operation thereof. The powered rollers that are aligned in the same direction may operate in combination with one another. For example, to move cargo in (or out) of the cargo railcar the powered roller 230 on the table and the powered roller 320 in the railcar may rotate in a first (or second) direction together. Likewise, to move cargo to the back (or front) of the car, the powered rollers 360, 370 in the railcar may rotate in a first (or second) direction together.

As noted above, the powered rollers may only rotate in certain directions if certain airbag sections are lifted as a precaution. For example, if the left tracks are not activated (tracks 380 in back of the railcar) and the powered rollers are activated in the left direction (toward back), the powered roller 360 may not operate as it could push cargo to a floor not configured for moving cargo, while the powered roller 370 may operate as it could be bringing cargo from right tracks (tracks 390 in front of the railcar) to the center. If the roller ball assemblies 500 are not activated the operation of all the powered rollers 320, 360, 370 in the railcar may be restricted.

It should be noted that while this disclosure focused on the use of powered rollers, that it is not limited thereto. Rather, any type of powered movement devices that could raise up slightly in operation and could be operated in alternating directions could be utilized without departing from the current scope. For example, powered conveyor belts capable of operation in either direction along a plane could be utilized in place of the powered rollers.

It should also be noted that while this disclosure focused on use of roller ball track assemblies to provide the multi-directional movement in the center of the railcar, that it is not limited thereto. Rather, the tracks could include any type of moveable parts that would enable movement in any direction without departing from the current scope. Furthermore, while the disclosure focused on the use of airbags to raise the roller balls within the tracks it is not limited thereto. Rather, any other means for raising the roller balls when activated could be utilized without departing from the current scope. Moreover, while the disclosure focused on the roller balls being housed within tracks it is not limited thereto. Rather, the roller balls could be located within various types of devices without departing from the current scope.

It should also be noted that while this disclosure focused on use of roller track assemblies to provide the bi-directional movement to/from the center of the railcar from/to the first/second side of the railcar (a first plane) and bi-directional movement to/from the center of the railcar from/to the cargo table (a second plane), that it is not limited thereto. Rather, the tracks could include any type of moveable parts that would enable bi-directional movement along the first or second plane without departing from the current scope. Furthermore, while the disclosure focused on the use of airbags to raise the rollers within the tracks it is not limited thereto. Rather, any other means for raising the rollers when activated could be utilized without departing from the current scope. Moreover, while the disclosure focused on the rollers being housed within tracks it is not limited thereto. Rather, the rollers could be located within various types of devices without departing from the current scope.

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

The invention claimed is:

1. A railcar loading system comprising
    a plurality of roller ball tracks located in a center of a railcar between doors thereof, wherein the roller ball tracks are capable of being activated to raise a plurality of roller balls above a floor of the railcar and enable cargo to move in any direction thereover;
    a first plurality of roller tracks located on a first side of the railcar, wherein the first plurality of roller tracks are capable of being activated to raise a first plurality of rollers above the floor and enable cargo to move in a first direction from the center of the railcar to the first side of the railcar or in a second direction from the first side of the railcar to the center of the railcar;
    a second plurality of roller tracks located on a second side of the railcar, wherein the second plurality of roller tracks are capable of being activated to raise a second plurality of rollers above the floor and enable cargo to move in the first direction from the second side of the railcar to the center of the railcar or in the second direction from the center of the railcar to the second side of the railcar;
    a first powered movement device located in the center of the railcar, wherein the first powered movement device is capable of being activated to raise above the floor and to operate in a third direction to move cargo in the third direction associated with moving cargo into the railcar or to operate in a fourth direction to move cargo in the fourth direction associated with moving cargo out of the railcar;
    at least one second powered movement device located in the center of the railcar, wherein the at least one second powered movement device is capable of being activated to raise above the floor and to operate in the first direction to move cargo in the first direction within the railcar or operate in the second direction to move cargo in the second direction within the railcar; and
    a wireless controller to control operation of the system.

2. The railcar loading system of claim 1, wherein the wireless controller includes track buttons to control operation of respective ones of the plurality of roller ball tracks, the first plurality of roller tracks and the second plurality of roller tracks.

3. The railcar loading system of claim 1, wherein the wireless controller includes direction buttons associated with moving the cargo in the first, the second, the third or the fourth directions, wherein when a particular direction button of the direction buttons is depressed associated ones of the first powered movement device and the at least one second powered movement device are activated to be raised and to operate in the direction associated with the particular direction button that is depressed for as long as the particular direction button is depressed.

4. The railcar loading system of claim 1, wherein the plurality of roller ball tracks, the first plurality of roller tracks, the second plurality of roller tracks, the first powered movement device and the at least one second powered movement device include airbags, wherein the associated airbags are inflated to raise appropriate ones of the roller balls, the first plurality of rollers, the second plurality of rollers, the first powered movement device and the at least one second powered movement device above the floor.

5. The railcar loading system of claim 4, further comprising
    an air connection on each side of the railcar; and
    a solenoid air valve to route air to the associated airbags based on signals received thereby.

6. The railcar loading system of claim 1, further comprising
    a cargo table located on a cargo bay capable of connecting to the railcar, the cargo table including
        a third plurality of roller tracks, wherein the third plurality of roller tracks are capable of being activated to raise a third plurality of rollers above a floor of the cargo table and enable cargo to move in the third direction from the cargo table to the railcar or in the fourth direction from the railcar to the cargo table; and
        a third powered movement device, wherein the third powered movement device is capable of being activated to raise above the floor and to operate in the third direction to move cargo in the third direction associated with moving cargo into the railcar or to operate in the fourth direction to move cargo in the fourth direction associated with moving cargo out of the railcar; and
    a control panel for receiving commands from the wireless controller and providing the commands to the railcar and the cargo table.

7. The railcar loading system of claim 6, wherein the control panel and the wireless controller are paired together so that commands from the wireless controller are interpreted based on which side of the railcar the control panel is located.

8. The railcar loading system of claim 1, wherein at least one of the first powered movement device and the at least one second powered movement device is a powered roller.

9. The railcar loading system of claim 1, wherein at least one of the first powered movement device and the at least one second powered movement device is a powered conveyor.

10. A railcar loading system comprising
    at least one cargo railcar having a door on each side thereof and including
        a first plurality of tracks located in a center of the railcar between the doors thereof, wherein the first plurality of tracks are capable of being activated to raise a first plurality of movable parts above a floor of the railcar, wherein the first plurality of moveable parts enable cargo to move in any direction thereover;
        a second plurality of tracks located on a first side of the railcar, wherein the first plurality of tracks are capable of being activated to raise a second plurality of moveable parts above the floor, wherein the second plurality of moveable parts enable cargo to move in a first direction from the center to the first side of the railcar or in a second direction from the first side to the center of the railcar;

a third plurality of tracks located on a second side of the railcar, wherein the third plurality of tracks are capable of being activated to raise a third plurality of moveable parts above the floor, wherein the third plurality of moveable parts enable cargo to move in the first direction from the second side to the center of the railcar or in the second direction from the center to the second side of the railcar;

a first powered movement device located in the center of the railcar, wherein the first powered movement device is capable of being activated to raise above the floor and to operate in a third direction to move cargo in the third direction associated with moving cargo into the railcar or to operate in a fourth direction to move cargo in the fourth direction associated with moving cargo out of the railcar; and at least one second powered movement device located in the center of the railcar, wherein the at least one second powered movement device is capable of being activated to raise above the floor and to operate in the first direction to move cargo in the first direction within the railcar or operate in the second direction to move cargo in the second direction within the railcar;

a cargo table capable of connecting to the railcar, the cargo table including a fourth plurality of tracks, wherein the fourth plurality of tracks are capable of being activated to raise a fourth plurality of moveable parts above a floor of the table and enable cargo to move in the third direction from the table to the railcar or in the fourth direction from the railcar to the table; and a third powered movement device, wherein the third powered movement device is capable of being activated to raise above the floor and to operate in the third direction to move cargo in the third direction associated with moving cargo into the railcar or to operate in the fourth direction to move cargo in the fourth direction associated with moving cargo out of the railcar;

a wireless controller to control operation of the railcar and the cargo table; and a control panel for receiving commands from the wireless controller and providing the commands to the railcar and the cargo table.

11. The railcar loading system of claim 10, wherein the control panel and the wireless controller are paired together so that commands from the wireless controller are interpreted based on which side of the railcar the control panel is located.

12. The railcar loading system of claim 10, wherein the wireless controller includes track buttons to control operation of respective ones of the first plurality of tracks, the second plurality of tracks, the third plurality of tracks or the fourth plurality of tracks.

13. The railcar loading system of claim 10, wherein the wireless controller includes direction buttons associated with moving the cargo in the first, the second, the third or the fourth directions, wherein when a particular direction button of the direction buttons is depressed associated ones of the first powered movement device, the at least one second powered movement device, and the third powered movement device are activated to be raised and to operate in the direction associated with the particular direction button that is depressed for as long as the particular direction button is depressed.

14. The railcar loading system of claim 10, wherein at least one of the first powered movement device, the at least one second powered movement device, and the third powered movement device is a powered roller.

15. The railcar loading system of claim 10, wherein at least one of the second, third or fourth plurality of tracks are roller tracks and the second, third or fourth plurality of moveable parts are rollers.

16. The railcar loading system of claim 10, wherein the first plurality of tracks are roller ball tracks and the first plurality of moveable parts are roller balls.

17. A railcar loading system comprising
at least one cargo railcar having a door on each side thereof and including
a plurality of roller ball tracks located in a center of the railcar between the doors thereof, wherein the plurality of roller ball tracks include airbags that are capable of being inflated when the plurality of roller ball tracks are activated to raise a plurality of roller balls above a floor of the railcar and enable cargo to move in any direction thereover;
a first plurality of roller tracks located on a first side of the railcar, wherein the first plurality of roller tracks include airbags that are capable of being inflated when the first plurality of roller tracks are activated to raise a first plurality of rollers above the floor and enable cargo to move in a first direction from the center of the railcar to the first side of the railcar or in a second direction from the first side of the railcar to the center of the railcar;
a second plurality of roller tracks located on a second side of the railcar, wherein the second plurality of roller tracks include airbags that are capable of being inflated when the second plurality of roller tracks are activated to raise a second plurality of rollers above the floor and enable cargo to move in the first direction from the second side of the railcar to the center of the railcar or in the second direction from the center of the railcar to the second side of the railcar;
a first powered roller located in the center of the railcar, wherein the first powered roller includes an airbag that is capable of being inflated when movement in a third direction associated with moving cargo into the railcar or in a fourth direction associated with moving cargo out of the railcar is activated, when the airbags are inflated the first powered roller is raised above the floor and is to operate in the third direction to move cargo in the third direction or to operate in the fourth direction to move cargo in the fourth direction;
at least one second powered roller located in the center of the railcar, wherein the at least one second powered roller includes an airbag that is capable of being inflated when movement in the first direction or the second direction is activated, when the airbags are inflated the at least one second powered roller is raised above the floor and is to operate in the first direction to move cargo in the first direction or operate in the second direction to move cargo in the second direction;
an air connection on each side of the railcar;
an electrical/data connection on each side of the railcar; and a solenoid air valve to route air to the appropriate airbags based on signals received thereby;

a cargo table capable of connecting to the railcar, the cargo table including a third plurality of roller tracks, wherein the third plurality of roller tracks include airbags that are capable of being inflated when the third plurality of roller tracks are activated to raise a third plurality of rollers above a floor of the table and enable cargo to move in the third direction from the table to the railcar or in the fourth direction from the railcar to the table;

a third powered roller, wherein the third powered roller includes an airbag that is capable of being inflated when movement in the third direction associated with moving cargo into the railcar or in the fourth direction associated with moving cargo out of the railcar is activated, when the airbags are inflated the third powered roller is raised above the floor and is to operate in the third direction to move cargo in the third direction or to operate in the fourth direction to move cargo in the fourth direction;

an air connection; and an electrical/data connection;

an air source for providing air to the railcar and the cargo table;

a wireless controller to control operation of the railcar and the cargo table; and a control panel for receiving commands from the wireless controller and providing the commands to the railcar and the cargo table.

18. The railcar loading system of claim 17, wherein the control panel and the wireless controller are paired together so that commands from the wireless controller are interpreted based on which side of the railcar the control panel is located.

19. The railcar loading system of claim 17, wherein the wireless controller includes track buttons to control operation of respective ones of the plurality of roller ball tracks, the first plurality of roller tracks, the second plurality of roller tracks and the third plurality of roller tracks.

20. The railcar loading system of claim 17, wherein the wireless controller includes direction buttons associated with moving the cargo in the first, the second, the third or the fourth directions, wherein when a particular direction button of the direction buttons is depressed associated ones of the first powered roller, the at least one second powered roller, and the third powered roller are activated to raise above the floor and to operate in the direction associated with the particular direction button that is depressed for as long as the particular direction button is depressed.

* * * * *